United States Patent
Johnson

(10) Patent No.: US 7,361,402 B2
(45) Date of Patent: Apr. 22, 2008

(54) CROSS-LINKED PRIMER COMPOSITION AND USE THEREOF IN THERMOFORMABLE FILMS

(75) Inventor: Michael A. Johnson, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 375 days.

(21) Appl. No.: 10/491,655

(22) PCT Filed: Oct. 31, 2002

(86) PCT No.: PCT/US02/34991

§ 371 (c)(1),
(2), (4) Date: Apr. 2, 2004

(87) PCT Pub. No.: WO03/037648

PCT Pub. Date: May 8, 2003

(65) Prior Publication Data

US 2004/0224101 A1 Nov. 11, 2004

Related U.S. Application Data

(60) Provisional application No. 60/336,449, filed on Oct. 31, 2001.

(51) Int. Cl.
*B32B 15/08* (2006.01)
(52) U.S. Cl. .......... 428/336; 428/421; 428/425.8; 428/425.9; 428/463; 428/520; 428/522
(58) Field of Classification Search ............ 428/463, 428/520, 522, 336, 421, 425.8, 425.9
See application file for complete search history.

(56) References Cited

U.S. PATENT DOCUMENTS

| | | | |
|---|---|---|---|
| 3,616,044 A | * | 10/1971 | Kehr .................. 156/320 |
| 3,654,062 A | | 4/1972 | Loew |
| 4,101,698 A | | 7/1978 | Dunning et al. |
| 4,115,619 A | | 9/1978 | Kurfman et al. |

(Continued)

FOREIGN PATENT DOCUMENTS

EP 0 045 421 A2 2/1982

(Continued)

OTHER PUBLICATIONS

M.P. Stevens, *Polymer Chemistry An Introduction*, 3rd edition, Oxford University Press, p. 104 (1999).
Wicks et al., *Organic Coatings: Science and Technology*, vol. 1: Film Formation, Components, and Appearance, John Wiley and Sons, p. 38 (1992).

(Continued)

*Primary Examiner*—D. S Nakarani
(74) *Attorney, Agent, or Firm*—Lisa P. Fulton; Jean A. Lown

(57) ABSTRACT

A primer layer and a thermoformable film that includes the primer layer are provided. The primer layer includes a cross-linked adhesive polymer having a semicrystalline region and a polar region. The cross-linked adhesive polymer has a tensile strength at maximum elongation that is less than that of an otherwise identical adhesive polymer that has not been cross-linked. The primer layer can be an outer layer of the thermoformable film, can be positioned between two additional layers of the thermoformable film, or a combination thereof. The primer layer can be positioned in contact with a mold surface during a thermoforming process.

47 Claims, 8 Drawing Sheets

U.S. PATENT DOCUMENTS

| | | | | |
|---|---|---|---|---|
| 4,732,944 | A * | 3/1988 | Smith, Jr. | 525/329.9 |
| 4,906,494 | A * | 3/1990 | Babinec et al. | 428/35.2 |
| 5,081,213 | A | 1/1992 | Carlson | |
| 5,196,246 | A | 3/1993 | Kauss et al. | |
| 5,290,625 | A | 3/1994 | Eisfeller et al. | |
| 5,725,712 | A * | 3/1998 | Spain et al. | 156/230 |
| 5,811,053 | A | 9/1998 | Ota et al. | |
| 5,840,783 | A * | 11/1998 | Momchilovich et al. | 522/112 |
| 5,968,657 | A | 10/1999 | Scullin et al. | |
| 6,071,621 | A | 6/2000 | Falaas et al. | |
| 6,083,335 | A | 7/2000 | Scullin et al. | |
| 6,287,672 | B1 | 9/2001 | Fields et al. | |
| 2002/0055006 | A1* | 5/2002 | Vogel et al. | 428/520 |

FOREIGN PATENT DOCUMENTS

| | | |
|---|---|---|
| EP | 0 392 847 A2 | 10/1990 |
| EP | 0 549 809 A1 | 7/1993 |
| EP | 0 551 526 A1 | 7/1993 |
| EP | 0 587 353 A1 | 3/1994 |
| EP | 0 653 279 A1 | 5/1995 |
| EP | 0 782 908 A2 | 7/1997 |
| EP | 0 978 374 A2 | 2/2000 |
| EP | 1 123 791 A1 | 8/2001 |
| GB | 972 662 | 10/1964 |
| GB | 1 361 538 | 7/1974 |
| GB | 1 512 084 | 5/1978 |
| GB | 2 107 636 | 5/1983 |
| WO | WO 88/07416 | 10/1988 |
| WO | WO 01/26879 | 4/2001 |
| WO | WO 03/037605 A1 | 5/2003 |

OTHER PUBLICATIONS

R. Peterson, *Thermoforming Handbook*, Klockner Pentaplast, May 10, 1996, Revision 2.

*A Processing Guide for Thermoforming*, Bayer Thermoplastics, Bayer Corporation, 100 Bayer Road, Pittsburgh, PA, copyright 1998.

* cited by examiner

CROSS-LINKED PRIMER COMPOSITION AND USE THEREOF IN THERMOFORMABLE FILMS

Cross Reference to Related Applications

This application claims priority to U.S. Provisional Application Ser. No. 60/336,449, filed Oct. 31, 2001, the entire disclosure of which is incorporated by reference herein.

FIELD OF THE INVENTION

The present invention relates to primer layers and thermoformable films that include the primer layers. More particularly, the primer layers include a cross-linked adhesive polymer having a semicrystalline region and a polar region. The cross-linked adhesive polymer has a tensile strength at maximum elongation that is less than that of an otherwise identical adhesive polymer that has not been cross-linked.

BACKGROUND OF THE INVENTION

Decorative, thermoformable films are widely used to form three-dimensional, decorative accessories and panels that can be attached to a wide variety of industrial and consumer items such as motor vehicles, boats, furniture, building materials, appliances, and the like. For instance, metallized polymeric films have been used to fabricate three-dimensional objects that look as if they are made from metal. Substitution of these objects for their metal counterparts can result in at least one of the following: lighter weight, lower manufacturing costs, better weather resistance, and sharper detail.

Fabricating three-dimensional objects with surfaces that look metallic is only one of many possible applications for decorative, thermoformable films. Many different surface effects can be incorporated into a thermoformable film, and these decorative films can be used in a wide variety of applications. For example, decorative films can also be used to provide surfaces that appear, for example, to be painted or colored, to be fluorescent or phosphorescent, or to be mirror-like or retroreflective. The surfaces can also look like wood, stone or other ceramic, parchment or other paper, or leather or other textile fabrics. The surfaces can be decorated with one or more graphic images or patterns. WO 88/07416 and U.S. Pat. No. 6,083,335 describe thermoformable films that have surfaces that appear as high gloss painted surfaces for use in the automotive industry. U.S. Pat. No. 6,071,621 describes metallized polymeric films that can be used to make a wide variety of articles for automotive, furniture, and other uses.

In a conventional thermoforming process, thermoformable film is formed into a three-dimensional shaped film and then reinforced by backfilling with a curable fluid (e.g., a polymeric material) that hardens to form a supporting body. To improve the strength of the bond between the film and the reinforcement, it is common for the film to have a primer layer (also referred to as a tie layer). Many kinds of conventional primer layer compositions are known. Representative examples of conventional primer layer compositions include (1) a polyamide such as the materials described in EP 0,392,847 B1; (2) a hydroxy functional polymer such as a hydroxy functional polyurethane or vinyl resin (e.g., VAGH copolymer available from Dow Chemical); (3) a carboxyl functional polymer such as VMCH available from Dow Chemical; (4) an amine functional polymer; or combinations thereof.

SUMMARY OF THE INVENTION

Generally, the present invention relates to primer layers and use of the primer layers in thermoformable films. More specifically, the present invention provides primer layers that include a cross-linked adhesive polymer having a semicrystalline region and a polar region. The thermoformable films can be used in thermoforming processes not suitable for thermoformable films having conventional primer layers.

One aspect of the invention provides a thermoformable film that includes a primer layer and at least one additional layer. The primer layer includes a cross-linked adhesive polymer having a semicrystalline region and a polar region. The cross-linked adhesive polymer has a tensile strength at maximum elongation that is less than that of an otherwise identical adhesive polymer that has not been cross-linked. The force needed to elongate the cross-linked adhesive polymer to achieve good conformance against a molding surface tends to increase very little over the elongation ranges typically encountered in thermoforming operations.

There can be one or more primer layers included in the thermoformable film. For example, a first primer layer can be used as an outer layer of the thermoformable film and a second primer layer can be positioned between two additional layers of the film. The additional layers in the thermoformable film can include, but are not limited to, decorative layers and protective layers. The primer layer can be adjacent to the decorative layer and can be used, for example, to attach the decorative layer to a protective layer or to attach the decorative layer to reinforcement material. The primer layer can also be used to adhere an attachment system to a thermoformed shape.

Another aspect of the invention provides a thermoformable film that includes at least one primer layer, a decorative layer, and a transparent, protective layer. The primer layer includes a cross-linked adhesive polymer that can be the reaction product of co-polymerizable compounds that include a first monomer and a second monomer. The first monomer is an olefinic monomer having ethylenic unsaturation. The second monomer includes (meth)acrylic acid, a $C_1$ to $C_{20}$ (meth)acrylate ester, a (meth)acrylate salt, acrylic acid, a $C_1$ to $C_{20}$ acrylate ester, an acrylate salt, or a combination thereof. The thermoformable film has a structure arranged in an order selected from primer layer-decorative layer-protective layer, decorative layer-primer layer-protective layer, and primer layer-decorative layer-primer layer-protective layer.

An additional aspect of the invention provides a method of making a thermoformable film. The method includes providing an adhesive polymer having a semicrystalline region and a polar region and having a tensile strength at maximum elongation. The method further includes cross-linking the adhesive polymer to form a cross-linked adhesive polymer and to reduce the tensile strength at maximum elongation, preparing a primer layer that includes the cross-linked adhesive polymer, and forming a thermoformable film that includes the primer layer and at least one additional layer.

Another aspect of the invention provides a thermoforming method that includes providing a thermoformable film having a primer layer and at least one additional layer and thermoforming the film into a three-dimensional shaped film. The primer layer includes a cross-linked adhesive polymer having a semicrystalline region and a polar region. The adhesive polymer has a tensile strength at maximum elongation that is less than that of an otherwise identical adhesive polymer that has not been cross-linked.

Yet another aspect of the invention provides a polymer layer that includes a cross-linked adhesive polymer having a semicrystalline region and a polar region. The cross-linked adhesive polymer pas a tensile strength at maximum elongation that is less than that of an otherwise identical adhesive polymer that has not been cross-linked.

The force needed to elongate the cross-linked adhesive polymer to achieve good conformance against a molding surface tends to increase very little over the elongation ranges typically encountered in thermoforming operations.

The above summary of the present invention is not intended to describe each disclosed embodiment or every implementation of the present invention. The Figures and the detailed description that follow more particularly exemplify these embodiments.

BRIEF DESCRIPTIONS OF THE DRAWINGS

The invention can be more completely understood in consideration of the following detailed description of various embodiments of the invention in connection with the accompanying drawings, in which.

Figure 1:
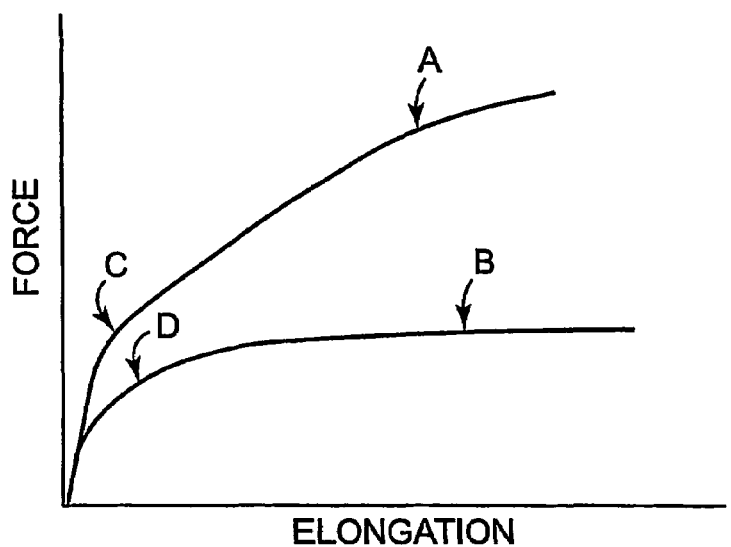
FIG. 1 is a plot of the force versus elongation for a semicrystalline, adhesive polymer before and after cross-linking.

While the invention is amenable to various modifications and alternative forms, specifics thereof have been shown by way of example in the drawings and will be described in detail. The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

DETAILED DESCRIPTION OF THE INVENTION

The present invention provides a primer layer and a thermoformable film that includes the primer layer and at least one additional layer. More particularly, the primer layer contains a cross-linked adhesive polymer having a semicrystalline region and a polar region. The adhesive polymer has a tensile strength at maximum elongation that is less than that of an otherwise identical adhesive polymer that has not been cross-linked.

The adhesive polymers have elongation and tensile strength properties suitable for use in thermoforming operations. The primer layer can be used, for example, to bond one layer of a thermoformable film to another layer. The primer layer can also be used to bond a surface of the thermoformable film to another material such as a reinforcement material.

As used herein, the term "polymer" refers to a compound that is a homopolymer or a copolymer. Homopolymers are typically prepared from a single monomer or oligomer. Copolymers are typically prepared from more than one monomers or oligomers.

As used herein, the term "semicrystalline" refers to material having regions of crystalline and amorphous character. The term "crystalline" with respect to an adhesive polymer means that the polymer exhibits at least some degree of macrocrystallinity, microcrystallinity, or a combination thereof. Referring to FIGS. 10-13, a polymer exhibits some degree of macrocrystallinity if an endothermic peak E is observed in a differential scanning calorimeter (DSC) plot, and the optical appearance of a film, having no fillers, is cloudy or translucent. A polymer exhibits some degree of microcrystallinity if an endothermic peak E is observed in a DSC plot and the film is clear or transparent as viewed by the unaided eye. As can be seen in FIGS. 10-13, the endothermic peak E can include a shoulder portion S. In contrast, an "amorphous" material without any crystalline regions typically exhibits no endothermic peak in a DSC plot and can be transparent, translucent, or opaque.

As used herein, the term "cross-linking" refers to the formation of bonds between one polymer or portion of a polymer to another polymer or portion of a polymer. The adhesive polymers included in the primer layers of the invention are typically cross-linked by formation of a free radical intermediate. Suitable cross-linking methods include, for example, the use of a chemical agent, actinic radiation, and ionizing radiation.

As used herein, the "maximum percent elongation" or "$E_{max}$" refers to a percent elongation that is the lesser of either (i) the elongation at break of the polymer film or (ii) 400% elongation.

Many conventional primer layers used with thermoformable films have drawbacks. For example, some conventional adhesive polymers do not have the elongation and/or the tensile strength that may be desired for thermoforming processes. When incorporated as a primer layer into an otherwise thermoformable film structure, these less than desirable properties of the adhesive polymers can adversely impact the elongation and/or tensile strength of the overall structure. As a consequence, the primer layer properties can impair the thermoformability of the film into deep draw shapes, can interfere with the resolution of the formed contour, can restrict the draft angles of the contour, or can restrict the depth to width ratio or the contour. Primer layers having more favorable elongation and tensile strength properties are desirable for thermoforming applications.

The primer compositions of the present invention include at least one cross-linked, adhesive polymer having a semicrystalline region and a polar region. Cross-linking can modify the elongation and tensile strength properties of the adhesive polymer. The force needed to elongate the cross-linked adhesive polymer to achieve good conformance against a molding surface tends to increase very little over the elongation ranges typically encountered in thermoforming operations. Compared to adhesive polymers without cross-linking or compared to adhesive polymers having a lower amount of cross-linking, the cross-linked adhesive polymers in the primer layers of the invention tend to have a lower tensile strength for the same percent elongation. In particular, the tensile strength at maximum elongation tends to be less. As a result of the lower tensile strength, the cross-linked adhesive polymer can be easier to thermoform.

Thermoformable films can be prepared that include the primer layer and at least one additional layer. The primer layer can be, for example, an outer layer of the thermoformable film, positioned between two additional layers of the film, or a combination thereof. The properties of the primer layers can enhance the elongation and tensile strength properties of films that include the primer layer. The films can be thermoformed into articles having, for example, contours with greater depth to width ratios, contours with lower draft angles, and contours with deeper draw shapes than can be obtained using conventional primers.

Some conventional primer layers have a tendency to adhere aggressively to a mold surface. Significant damage can occur when thermoformable film having such a primer layer as an outer layer is removed from the mold. This tendency of the conventional primer layers to adhere to the mold surface can occur even when the mold surfaces incorporate or have been treated with a mold release agent. Direct contact between conventional primer layers and mold surfaces are generally avoided. However, the avoidance of direct contact between the primer layer and the mold surfaces can limit the processes and types of molds that can be used to form three-dimensional shaped films from thermoformable films.

For example, when forming and backfilling a three-dimensional shaped film, the surface of the film that will be visible in the final article is typically positioned facing the surface of a female mold. The primer layer typically is on the opposite side of the film and does not contact the mold surface. If a male mold rather than a female mold were used to thermoform the film into the same shape or contour, the primer layer could be in direct contact with the male mold surface. Because of the tendency of the conventional primer layers to adhere to the mold surface, a female rather than a male mold is generally used when a primer layer is the outer layer of the thermoformable film. This is especially the case when the thermoforming process includes heating to a temperature that can soften the polymeric material in the primer layer. A primer layer that more easily releases from mold surfaces after thermoforming is desirable so that the range of practical, available molding techniques is less restricted.

The primer layer compositions of the present invention typically are not tacky at room temperature and can have excellent mold release characteristics at typical thermoforming temperatures (e.g., temperatures in the range of room temperature up to about 120° C. or in the range of about 60° C. to about 85° C.). Multilayered thermoformable films having a primer layer as an outer layer can be used in a wide range of thermoforming applications including those in which the primer layer directly contacts a mold surface. Thus, the primer layers of the present invention extend the range of thermoforming operations that can be used with primed, thermoformable films.

The thermoformable films can have any thickness suitable for thermoforming operations. In some applications, the films have a thickness up to about 50 mils (about 1.27 mm) or up to about 100 mils (2.54 mm). In some embodiments, the film can have a thickness in the range of about 0.5 to about 15 mils (about 0.01 to about 3.81 mm) or about 1 to about 5 mils (about 0.03 to about 0.13 mm); Relatively thin thermoformable films (e.g., those having a thickness up to about 50 mils) are used in many thermoforming applications because such films tend to be more conformable (i.e., more pliable, extensible, and flexible upon application of heat, pressure, and/or vacuum) and tend to exhibit more detail and more sharply defined features after thermoforming compared to thicker film counterparts.

A thermoformable film typically possesses sufficient elongation characteristics to be stretched against the contours of a mold surface. The requisite degree of elongation for a film can vary from application to application. In some instances, the films have an elongation up to about 15 percent, up to about 50 percent, up to about 100 percent, up to about 200 percent, up to about 400 percent, or beyond. In some instances, the film has elongations in the range of about-100 percent to about 400 percent. The elongation typically is determined at a temperature where the polymer softens (e.g., temperatures up to about 120° C. or in the range of about 60° C. to about 85° C.).

As used herein, a "non-self-supporting film" refers to a film that, by itself, fails to sufficiently retain its thermoformed shape when cooled and removed from a mold. The non-self-supporting film typically collapses upon itself. In some embodiments, a film can be deemed to be non-self-supporting if a free edge extending between adjacent corners of a 10 cm×10 cm film sample falls more than about 3 cm below a horizontal position relative to an opposite, supported edge of the sample extending between the remaining two, adjacent corners when such opposite, supported edge of the film is held horizontally and taut at an elongation in the range from 0 to 5 percent at 25° C. In some embodiments, the film sample can fall more than about 5 cm or more than about 10 cm from the horizontal position. Conversely, as used herein, a "self-supporting film" refers to a film that, by itself, can sufficiently retain its thermoformed shape when cooled and removed from a mold.

Primer Layers

The primer layers of the present invention include an adhesive polymer that is cross-linked. The adhesive polymer has a semicrystalline region and a polar region. The polar region can provide adhesion of the primer layer to other layers of the thermoformable film or to other materials such as reinforcement material. The adhesive polymer is typically cross-linked through the semicrystalline region. In some embodiments, the adhesive polymer is cross-linked through an amorphous portion of the semicrystalline region.

FIG. 1 compares plots of force versus percent elongation for the adhesive polymer before and after cross-linking. The tensile strength (i.e., psi) at any percent elongation can be determined by dividing the force (i.e., pounds) by the cross-sectional area (i.e., in$^2$) of the sample. The plots of force versus percent elongation at typically obtained at temperatures comparable to the mold temperature during thermoforming processes (e.g., the mold temperature can be in the range of room temperature to about 120° C. or in the range of about 60° C. to about 85° C.). The temperature used can vary depending on the composition of the polymeric film. Curve A is the plot obtained for a film prepared from the adhesive polymer before cross-linking. Curve A initially has a relatively steep slope, indicating a high modulus, until a transition zone, or yield point C, is reached. However, even after the transition zone C, the slope of the curve still tends to increase significantly with increasing elongation.

In contrast, curve B represents a plot of the force versus elongation for a film prepared from the same adhesive polymer after cross-linking. Like curve A, curve B initially has a relatively steep slope until its transition zone D is reached. However, after this transition zone, the slope of the curve is much flatter with increasing elongation compared to curve A. The reduced force in curve B for a selected elongation indicates that the cross-linked adhesive polymer should be easier to thermoform than its non-cross-linked counterpart. Less force is needed to elongate the adhesive polymer after cross-linking. In particular, less force is needed subject the adhesive polymer to maximum percent elongation.

In the practice of the present invention, the tensile strength reduction for the same percent elongation can be quantified by dividing the tensile strength at maximum percent elongation for the cross-linked adhesive by the tensile strength at maximum percent elongation for the non-cross-linked adhesive to obtain a tensile strength ratio. Typically, the primer layers of the present invention are characterized by a tensile strength ratio of less than about 0.95. In some embodiments, the tensile strength ratio is less than about 0.85, less than about 0.75, or less than about 0.60.

Any convenient method of determining force or tensile strength versus elongation can be used as long as the same procedure is used to obtain the data for both before and after cross-linking. According to one representative approach, an elongation tester such as an Instron™ tensile tester is used to determine the relationship between force or tensile strength and elongation. This specific test can be conducted, for example, using an oven fixture set at about 70° C. After clamping a sample into the jaws of the tester, the jaws are separated from each other at a controlled rate.

The primer layers of the invention containing cross-linked adhesive polymers can have improved thermoformability compared to non-cross-linked counterparts. When the primer layers are included in the thermoformable film, for example, deeper draw shapes can be produced during the thermoforming process. The result is unexpected in that one would conventionally expect cross-linking to reduce the elongation and increase tensile strength of a polymer, especially at elevated temperatures. For example, Stevens instructs that the higher the cross-link density, the greater will be the modulus (the less the elongation) in the rubbery state (see M. P. Stevens, *Polymer Chemistry An Introduction*, 3$^{rd}$ edition, Oxford University Press, p. 104 (1999)). Additionally, Wicks et al. instructs that when everything else is equal, the higher the cross-linking density, the higher the modulus. A higher modulus correlates with a harder film (see Wicks et al., *Organic Coatings: Science and Technology*, Volume 1: Film formation, Components, and Appearance, John Wiley and Sons, p. 38 (1992)).

The adhesive polymers included in the primer layers can be cross-linked using any suitable chemical cross-linking agent, actinic radiation source, or ionizing radiation source that can cross-link via formation of a free radical intermediate. Suitable chemical cross-linking agents include, for example, peroxides and azo compounds. Suitable actinic radiation includes ultraviolet radiation from sources such as, for example, xenon lamps, mercury vapor lamps, carbon arcs, and the like. Suitable ionizing radiation includes electron beam radiation, x-ray radiation, and gamma ray radiation.

The adhesive polymer typically contains only one type of moiety that can be cross-linked. Adhesive polymers that are polyfunctional in terms of cross-linking have a tendency to form polymerized networks that can be too rigid and/or insufficiently thermoplastic in character to be used conveniently in thermoforming operations. Additionally, excessive cross-linking can result in residual elasticity in the film that can lead to elastic recovery of the film causing loss of definition or shape in the thermoformed part.

The semicrystalline adhesive polymer can be, for example, a copolymer formed by reacting an olefinic material with a monomer having a polar group. The olefinic portion of the adhesive polymer is typically semicrystalline in nature (i.e., the olefinic portion has both crystalline and amorphous regions). The olefinic material can be formed by free radical polymerization of monomers such as, for example, ethylene, propylene, isobutylene, or combinations thereof. In some embodiments, the olefinic material includes an olefinic monomer having ethylenic unsaturation. For example, the adhesive polymer can be a copolymer formed by reacting a polyethylene oligomer or ethylene monomers with monomers having polar groups. The olefinic portion of the adhesive polymer can be cross-linked, for example, using electron beam radiation. In some embodiments, the adhesive polymer cross-links in an amorphous region of the olefinic portion.

The cross-linkable moiety is typically part of the semicrystalline component of the adhesive polymer. For example, the polymers can cross-link by abstraction of a secondary hydrogen from an olefinic portion of the polymeric backbone. Abstraction of the hydrogen atom results in the formation of a free radical intermediate. The free radical intermediate can combine with other olefinic radicals or additional polymers to form a higher molecular weight polymer. Depending on the structure of the olefinic portion of the polymeric backbone, the free radical intermediate can result in degradation reactions rather than in reactions that can increase the molecular weight by cross-linking the polymer. In some embodiments, the olefinic portion includes polyethylene and the amount of degradation attributable to scission reactions is low.

In some embodiments, the adhesive polymers can be cross-linked using electron beam radiation. The appropriate radiation dosage can be determined through routine experimentation. The dosage can vary depending on the composition of the adhesive polymer. Some polymers are more resistant to radiation-induced scission than other materials. For example, in some embodiments, the adhesive polymer contains a semicrystalline component that includes a polyolefin. Polyethylene can cross-link when exposed to electron beam radiation whereas polypropylene has an increased tendency to undergo chain scission reactions compared to polyethylene.

Typically, the dosage is as high as possible without unduly causing the polymer to undergo chain scission reactions that are in excess of the cross linking reactions. Loss of molecular weight can be an indicator that irradiation has unduly degraded the adhesive polymer. Accordingly, for polymers that tend to undergo chain scission reactions, the radiation dosage is typically limited such that the weight average molecular weight of the irradiated polymer is at least about 90%, at least about 95%, or at least about 99% of that of an otherwise identical polymer that has not been irradiated. The weight average molecular weight of the cross-linked adhesive polymer is preferably greater than the weight average molecular weight of an otherwise identical adhesive polymer that has not been cross-linked.

In some embodiments, the electron beam radiation dosage is less than about 10 Mrads. For example, the dosage can be in the range of about 0.1 to about 10 Mrads or in the range of about 3 to about 7 Mrads. The radiation voltage can typically be up to about 600 kVolts. For example, the voltage can be in the range of about 25 to about 600 kVolts, about 50 to about 300 kvolts, or about 100 to about at about 200 kVolts. Higher voltages can be used to penetrate a greater thickness of the adhesive polymer.

The adhesive polymers in the primer layer have a polar region. The polar region includes polar groups that can be directly or indirectly pendant from the polymeric backbone or that can be part of the polymeric backbone itself. In some embodiments, the polar groups are directly or indirectly pendant from the polymer backbone. The polar groups can promote adhesion between the adhesive polymer and a wide range of other materials including, for example, metal-containing compositions, ceramics, and polymeric materials having polar functionality and/or polar chain segments, or combinations of these.

Representative examples of polar groups include acids such as sulfonic, phosphoric, phosphonic, boric, or carboxylic groups, salts based on these acids, esters based on these acids, or combinations thereof. The polar groups can also include amine groups, alkoxy groups, nitrile groups, hydroxy groups, urethane groups, quaternary ammonium groups, heterocyclic moieties such as those described in U.S. Pat. No. 5,081,213, combinations of these, and the like.

The polar groups are typically incorporated in the adhesive polymer by reacting a monomer having a polar group with other monomers or oligomers that can impart the semicrystalline characteristic to the adhesive polymer. Representative monomers that have a polar group include N-vinyl-2-pyrrolidone, (meth)acrylamide, acrylamide, N-substituted (meth)acrylamide, N-substituted acrylamide, nonylphenol ethoxylate (meth)acrylate, monylphenol ethoxylate acrylate, isononyl (meth)acrylate, isononyl acrylate, isobornyl (meth)acrylate, isobornyl acrylate, 2-(2-ethoxyethoxy)ethyl (meth)acrylate, 2-(2-ethoxyethoxy) ethyl acrylate, beta-carboxyethyl (meth)acrylate, beta-carboxyethyl acrylate, maleic anhydride, itaconic acid, (meth)acrylic acid, acrylic acid, N-vinylcaprolactam, hydroxy functional caprolactone salt (meth)acrylate, hydroxy functional caprolactone salt acrylate, hydroxyethyl (meth)acrylate, hydroxy ethyl acrylate, hydroxymethyl (meth)acrylate, hydroxymethyl acrylate, hydroxypropyl (meth)acrylate, hydroxypropyl acrylate, hydroxyisopropyl (meth)acrylate, hydroxyisopropyl acrylate, hydroxybutyl (meth)acrylate, hydroxybutyl acrylate, hydroxyisobutyl (meth)acrylate, hydroxyisobutyl acrylate, tetrahydrofurfuryl (meth)acrylate, tetrahydrofurfuryl acrylate, N-vinyl-2-pyrrolidone, diethylene glycol (meth)acrylate, diethylene glycol acrylate, butanediol mono(meth)acrylate, butanediol nonoacrylate, (meth)acrylonitrile, acrylonitrile, beta-cyanoethyl-(meth)acrylate, beta-cyanoethyl-acrylate, 2-cyanoethoxyethyl (meth)acrylate, 2-cyanoethoxyethyl acrylate, p-cyanostyrene, p-(cyanomethyl)styrene, 2-hydroxyethyl (meth)acrylate, 2-hydroxyethyl acrylate, 2-hydroxypropyl (meth)acrylate, 2-hydroxypropyl acrylate, 1,3-dihydroxypropyl-2-(meth)acrylate, 1,3-dihydroxypropyl-2-acrylate, 2,3-dihydroxypropyl-1-(meth)acrylate, 2,3-dihydroxypropyl-1-acrylate, and the like. The monomer can also include an adduct of an alpha, beta-unsaturated carboxylic acid with caprolactone, an alkanol vinyl ether such as 2-hydroxyethyl vinyl ether, 4-vinylbenzyl alcohol, allyl alcohol, p-methylol styrene, (meth)acryloyloxyethyl trimethyl ammonium chloride, acryloyloxyethyl trimethyl ammonium chloride, (meth) acryloyloxyethyl acid phosphate, acryloyloxyethyl acid phosphate, (meth)acrylamidopropyl trimethylammonium chloride, acrylamidopropyl trimethylammonium chloride, (meth)acryloyloxypropyl dimethylbenzylammonium chloride, acryloyloxypropyl dimethylbenzylammonium chloride, vinylbenzyl trimethylammonium chloride, 2-hydroxy-3-allyloxypropyl trimethylammonium chloride, (meth) acrylamidopropyl sodium sulfonate, acrylamidopropyl sodium sulfonate, sodium styrene sulfonate, styrene sulfonic acid, maleic acid, fumaric acid, maleic anhydride, vinyl sulfonic acid, 2-(meth)acrylamide-2-methyl-1-propanesulfonic acid, 2-acrylamide-2-methyl-1-propanesulfonic acid, dimethylaminoethyl (meth)acrylate, dimethylaminoethyl acrylate, N-(3-sulfopropyl)-N-(meth)acryloyloxyethyl-N,N-dimethylammonium betaine, N-(3-sulfopropyl)-N-acryloyloxyethyl-N,N-dimethylarnimonium betaine, 2-(meth)acryloyloxyethyl trimethylammonium methosulfate, 2-acryloyloxyethyl trimethylammonium methosulfate, N-(3-sulfopropyl)-N-(meth)acrylamidopropyl-N,N-dimethylammonium betaine, N-(3-sulfopropyl)-N-acrylamidopropyl-N,N-dimethylammonium betaine, vinylbenzyl trimethylammonium chloride, mixtures thereof, and the like.

In some embodiments, the polar groups are acids groups, esters thereof, or salts thereof. For example, the polar groups are carboxylic acids, carboxylate esters, or carboxylate salts. Suitable carboxylic acids, carboxylate esters, and carboxylate salts include, but are not limited to, acrylic acid, $C_1$ to $C_{20}$ acrylate esters, acrylate salts, (meth)acrylic acid, $C_1$ to $C_{20}$ (meth)acrylate esters, (meth)acrylate salts, or combinations thereof. Such groups typically can provide suitable adhesion to other surfaces such as polymers, metal, and combinations thereof. Adhesive polymers having such polar groups can typically adhere to metallized polymeric film. Primer layer compositions that include these polar groups can be used to adhere a metal-containing layer to polymeric reinforcement or to protective layers, especially polymeric reinforcement and protective layers.

Suitable methacrylate and acrylate esters typically contain up to about 20 carbon atoms or up to about 12 carbon atoms (excluding the acrlyate and methacrylate portion of the molecules). In some embodiments, the methacrylate and acrylate esters contain about 4 to about 12 carbon atoms.

In some embodiments, the adhesive polymer is a reaction product of co-polymerizable compounds that include a first monomer that provides that sernicrystalline region and a second monomer that provides the polar region. For example, the first monomer can include an olefinic monomer having ethylenic unsaturation and the second monomer can include (meth)acrylic acid, a $C_1$ to $C_{20}$ (meth)acrylate ester, a (meth)acrylate salt, acrylic acid, a $C_1$ to $C_{20}$ acrylate ester, an acrylate salt, or a combination thereof. The adhesive polymer can be prepared using about 80 to about 99 weight percent of the olefinic monomer and about 1 to about 20 weight percent or the second monomer. For example, the adhesive polymer can be prepared by copolymerizing about 83 to about 97 weight percent of the olefinic monomer and about 3 to about 17 weight percent acrylic acid, a $C_1$ to $C_{20}$ acrylate ester, an acrylate salt, (meth)acrylic acid, a $C_1$ to $C_{20}$ (meth)acrylate ester, a (meth)acrylate salt, or combinations thereof. In another example; the adhesive polymer contains from about 90 to about 96 weight percent of the olefinic monomer and about 4 to about 10 weight percent acrylic acid, a $C_1$ to $C_{20}$ acrylate ester, an acrylate salt, (meth)acrylic acid, a $C_1$ to $C_{20}$ (meth)acrylate ester, a (meth)acrylate salt, or combinations thereof.

The positive ion of the salts typically includes alkali metal ions, alkaline earth metal ions, or transition metal ions. For example, the positive ion can include, for example, sodium, potassium, calcium, magnesium, or zinc.

In some embodiments of the thermoformable film, the primer layer includes an adhesive polymer such as, for example, ethylene (meth)acrylic acid or ethylene acrylic acid. Surprisingly, such primer layer can adhere well to metal-containing layers in a thermoformable film while forming a surface that can be removed from a mold after thermoforming.

Commercially available adhesive polymers are available from Dow Chemical Co. under the trade designation "PRIMACOR." One such copolymer is PRIMACOR 3330, which has 6.5% acrylic acid and 93.5% ethylene. Other commercially available adhesive polymers are available from Dupont under the trade designation "NUCREL" such as NUCREL 0403 (a copolymer of ethylene and methacrylic acid), under the trade designation "ELVALOY" (copolymers of ethylene with butyl acrylate, ethyl acrylate, or methyl acrylate), and under the trade designation "SURYLN" (ionomer of ethylene and acrylic acid).

Other suitable commercially available adhesive polymer are available from Dupont under the trade designation "BYNEL" (acid modified ethylene vinyl acetate polymers) and under the trade designation "ELVAX" (ethylene vinyl acetate copolymers and ethylene/vinyl acetate/acid terpolymers).

The primer layer can also include various additives. Suitable additives include, but are not limited to, antioxidants, UV stabilizers, pigments, plasticizers, gloss control agents, leveling agents, antistatic agents, bactericides, fingicides, fillers, combinations of these, and the like.

Thermoformable Films

Another aspect of the invention provides a thermoformable film that includes a primer layer and at least one additional layer. The primer layer includes a cross-linked, adhesive polymer that has a semicrystalline region and a polar region. The primer layer can be an outer layer of a thermoformable film, can be one or more internal layers of a thermoformable film, or can be a combination thereof.

The primer layer can be incorporated into the thermoformable film in a variety of ways. For example, a suitable composition including the adhesive polymer and/or precursor(s) thereof can be coated from solution, melt, dispersion, or the like and then dried, cured, or the like, to form a primer layer in situ. Alternatively, a primer layer incorporating the adhesive polymers can be pre-made into a film, such as by extrusion, and then adhered, laminated, or otherwise attached to one or more other layers to form the thermoformable film. The primer layer can be cross-linked either before or after attachment to the other layers of the thermoformable film. In some embodiments, the primer layer can be irradiated with an electron beam to cross-link the adhesive polymer after incorporation of the primer layer into the thermoformable film.

The primer layers can provide continuous, discontinuous, patterned, or random coverage of the surface(s) to be primed. When the primer layer is prepared in the form of a film, it can be cast, for example, on a release liner. Suitable release liners include, but are not limited to, paper or biaxially oriented polyester itself, or biaxially oriented polyester that has been coated on one or both sides with release coatings. In some embodiments, the release liner has two different release coating and one of the release coatings exhibits a lower degree of adhesion to the primer layer than the other release coating. The release liner can protect the surfaces of the film until it is ready to be used.

Whether formed in situ on a surface to be primed, or pre-formed as a film, the thickness of the primer layer typically is sufficient to impart a desired priming effect to the surfaces that are to be bonded together. The thickness can vary depending on the application. In many applications, the thickness of the primer layers can be up to about 100 micrometers. For example, the primer layer can have a thickness in the range of about 12 micrometers to about 75 micrometers or in the range of about 20 micrometers to about 65 micrometers. In many embodiments, the thickness is selected to achieve the desired adhesive performance at a minimal thickness. For example, the thickness can be less than about 20 micrometers.

The thermoformable films of the invention can include those having a decorative surface appearance (hereinafter "decorative film"). The decorative films can include those having a wide variety of different surface appearances. For example, the surfaces can appear to be painted, to have a wood grain, to have a metallic finish such as a chrome-like finish, to be paper or parchment, to be stone or a ceramic material, to be leather or another textile, to have one or more graphic elements or patters, to contain alphanumeric information, to be retroreflective or mirror-like, to be fluorescent or phosphorescent, to be glossy, matted or otherwise textured, or to be a combination of these.

As used herein, the term "metallized polymeric film" refers to a thermoformable film that includes at least one polymer layer and at least one metal-containing layers directly or indirectly adjacent to at least a portion of polymer layer. In some embodiments, the metal-containing layer is free of polymeric material. For example, the metal-containing layer can be a layer containing only metallic materials. The metal-containing layers can contain a continuous layer of metal or alloy bonded to or otherwise deposited on a polymeric layer such as, for example; a protective layer. A primer or tie layer can be disposed between the metal layer and the polymeric layer.

The various layers in the thermoformable films can be prepared from one or more polymers and can be composites of one or more polymers with other materials. Suitable materials that can be included in composites include, for example, inorganic particles or films, metals, metal alloys, pigments, passivating agents, silane compounds, metal chelates, intermetallic compositions, organic materials, conventional additives, combinations of these, and the like.

Figure 2:
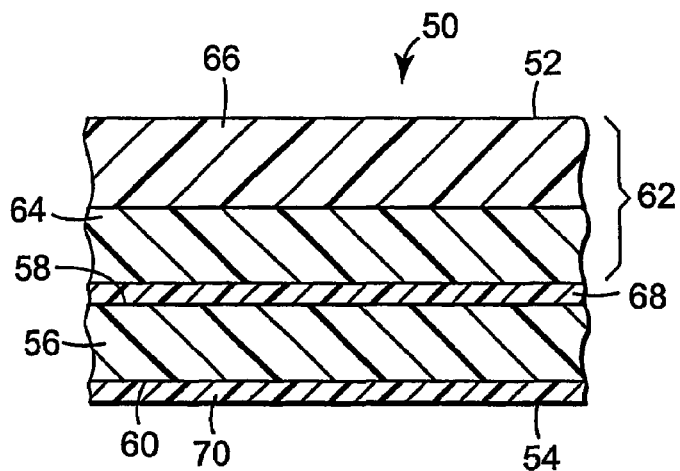
FIG. 2 is a schematic cross-section of one embodiment of a thermoformable film of the present invention.

FIG. 2 schematically shows one embodiment of a thermoformable, decorative film that includes a primer layer of the present invention. The thermoformable film 50 has an outer surface 52 and an inner surface 54. The outer surface 52 corresponds to the outer surface of an article formed from the thermoformable film. Similarly, the inner surface 54 corresponds to the inner surface of the article formed from the thermoformable film. The thermoformable film 50 has a multilayer construction that includes a decorative layer 56 with first 58 and second 60 major surfaces. An optional first primer layer 68 (also referred to as a tie layer) overlies the first surface 58 of the decorative layer 56. A transparent, protective layer 62 overlies the primer layer 68. The first primer layer 68 not only helps protect the decorative layer to some degree, but also helps adhere the film to the protective layer 62. A second primer layer 70 can be disposed on the second surface 60 of the decorative layer. The second primer layer 70 can promote adhesion of the decorative layer 56 to other materials such as to an optional reinforcement or backing material (not shown), a substrate, or the like. The first primer layer 68 and the second primer layer 70 typically have a thickness up to about 100 micrometers. In some embodiments, the thickness can be in the range of about 5 to about 30 micrometers or about 6 to about 13 micrometers.

The various layers of the film may be formed from one or more constituent sublayers. For example, the transparent, protective layer 62 of this representative embodiment includes an inner clear coat layer 64 and an outer clear coat layer 66.

The decorative layer 56 is generally included in the thermoformable film to provide an outer surface 52 having a desired visual appearance. The decorative layer is typically at least partially visually discernible through the transparent, protective layer 62. The decorative layer 56 can be continuous or discontinuous. In some embodiments, the decorative layer 56 is in the form of a metal-containing layer that provides at least a portion of the outer surface 52 of the film 50 with a metallic appearance.

In some embodiments, the metal-containing layer is opaque, highly reflective, and/or has a polished, mirror-like finish. A typical optical density of the metal layer is about 0.9 to about 3.0 as determined on a MacBeth TD 930 densitometer using a yellow filter. The metal containing layer generally has a thickness needed to provide the desired surface appearance. The thickness is not so great as to adversely affect the thermoformability of decorative film. The metal-containing layer typically has a thickness in the range of about 50 to about 2500 Angstroms. In some embodiments, the metal-containing layer has a thickness in the range of about 300 to about 1200 Angstroms.

The metal-containing layer can be selected from a wide range of metal-containing materials such as, for example, metals, alloys, and intermetallic compositions. The metal-containing materials can include one or more of tin, aluminum, indium, nickel, iron, manganese, vanadium, cobalt, zirconium, gold copper, silver, chromium, zinc, alloys thereof, combinations of these, and the like.

The transparent, protective layer 62 overlies the decorative layer 56 and typically includes one or more clear coat layers (e.g., layers 64 and 66 in FIG. 2). As used herein, the term "transparent" refers to materials that allow at least some amount of light to pass through the materials. In some embodiments, transparent materials allow greater than 50 percent, greater than 75 percent, greater than 90 percent, greater than 95 percent, or 100 percent of the light to pass through the materials.

The protective layer can be formed from any of a wide variety of light transmissive, protective materials that also can provide the outer surface 52 of the thermoformable film 50 with one or more of the following properties: abrasion resistance, high or low gloss as desired, color(s), high or low reflectivity as desired, weather resistance, heat-resistance, impact resistance, resiliency, ultra-violet resistance, protection against oxidation, water resistance, solvent resistance, and/or the like. A wide variety of protective layers are known and can be used in the practice of the present invention. For example, one embodiment of a transparent, protective layer includes a thermoplastic fluorinated polymer dispersed in an acrylic resin as described in U.S. Pat. No. 5,968,657. Other compositions are described in U.S. Pat. No. 6,071,621. The polymers included in the protective layer can include cross-linked polymers such as, for example, a cross-linked polyurethane.

In one embodiment of a thermoformable film, the protective layer 62 includes an inner 64 and an outer 66 clear coat layers. The inner clear coat layer 64 can be used for a variety of purposes such as enhancing the reflective, mirror-like appearance of the underlying decorative layer, especially when the decorative layer has a metallic appearance. The inner clear coat layer 64 can be formed from a solvent cast polyurethane such as an aliphatic polyurethane. A solvent based coating typically provides a smooth surface on which to deposit the metal-containing layer without interfering with the overall elongation characteristics of the film. A solvent based coating can also help provide resistance to weathering when an aliphatic isocyanate is selected. The inner clear coat layer 64 typically has a thickness in the range of about 5 to about 50 micrometers.

Solvent based polyurethane precursors are commercially available from Bayer Corporation, Pittsburgh, Pa., under the trade designation "DESMOPHEN". Suitable products include, for example, polyester polyols (e.g., product numbers product numbers 631A, 650A, 651A, 670A, 680, 1100, 1150); polyether polyols (e.g. product numbers 550 U, 1600 U, 1900 U, 1950 U); and acrylic polyols (e.g., product numbers A160SN, A375, A450B A/X). The clear coat may be formed from one or more polyols and reacted with an isocyanate to form a polyurethane. Isocyanates are commercially available from Bayer Corp, under the trade designation "MONDUR" and ' DESMODUR" such as, for example, DESMODUR XP7100 and DESMODUR 3300.

The outer clear coat layer can be formed from a dispersion that includes aliphatic waterborne polyurethane resins such as those described in U.S. Pat. No. 6,071,621. The outer clear coat layer typically has a thickness in the range of about 0.5 mils to about 3.0 mils. The outer clear coat provides a protective coating that can exhibit good environmental stability. Commercially available aliphatic waterborne polyurethanes include the materials from Avecia (Waalwijk in The Netherlands) under the trade designation "NEOREZ", such as NEOREZ XR 9699, XR 9679, and XR 9603, or from Bayer, Corp. under the trade designation "BAYHDROL", such BAYHYDROL 121. The polyurethane compositions typically include small amounts of a cross-linking agent, e.g., less than about 2.5%, such as a diaziridine. An example of a commercially available diaziridine is NEOCRYL CX-100 available from Avecia.

The film embodiments of FIG. 2 can be fabricated using any suitable approach. According to one representative approach, a coatable fluid that includes the constituents and/or precursors of the outer clear coat layer 66 can be cast or otherwise coated onto a release liner, dried, and/or cured. The inner clear coat layer 64 can be formed over the outer clear coat layer 66 in a similar fashion from a coatable fluid that includes the desired constituents or precursors thereof. Next, the primer layer 68 can optionally be disposed on the inner clear coat layer. The primer layer can be formed by coating, lamination, or the like. The decorative layer 56 can be coated or laminated onto the primer layer. If the decorative layer is metallic, the metal-containing layer preferably is formed using a suitable technique such as, for example, sputtering, vapor deposition, ion beam deposition, or chemical vapor deposition. A second primer layer 70 can be disposed on the decorative layer. The second primer layer can be formed by coating, lamination, or the like.

As shown in FIG. 2, the thermoformable film can contain more than one primer layer. In some embodiments of the thermoformable film of the invention, only one primer layer is used. The primer layer can be, for example, adjacent to a decorative layer. The primer layer can be on either surface of the decorative layer. For example, the primer layer can be used to attach the decorative layer to another layer such as a protective layer. In this example, the primer layer can be interposed between the decorative layer and the protective layer. In another example, the primer layer can be an outer layer of a thermoformable film. The primer layer can be attached, for example, to a surface of a decorative layer that is not visible in the final thermoformed article. A primer layer present as an outer layer of a thermoformable film can be used, for example, to attach reinforcement material to a thermoformed shape.

In some thermoformable films that include a decorative layer, the decorative layer can be disposed between two polymeric layers. Each polymeric layer can include a cross-linked polymer.

In thermoformable films that include a decorative layer and a protective layer, one or more primer layers can be used. For example, the thermoformable film can have a structure arranged in an order such as primer layer-decorative layer-protective layer, decorative layer-primer layer-protective layer, or primer layer-decorative layer-primer layer-protective layer. In some embodiments, the protective layer and the primer layer are both cross-linked.

Thermoforming Processes

FIGS. 3 through 9 schematically show one methodology in which the thermoformable film of the present invention can be thermoformed into a three-dimensional shaped film. Other thermoforming processes can be used with the primer layer and the thermoformable film of the invention.

Figure 3:
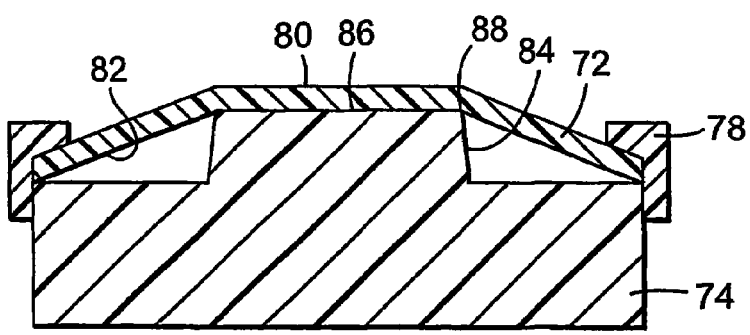
FIG. 3 is a schematic diagram of one embodiment of a thermoformable film positioned in proximity to a male mold.

In FIG. 3, the thermoformable film 72 is provided from a suitable supply (not shown) such as a roll or the like and positioned in operational proximity to a male mold 74. The film 72 is generally supported in a taut state using suitable tooling such as a clamping frame 78. The outer surface of the film 80, corresponding to the visually discernible surface of the object to be formed, is positioned outward relative to the male mold 74, while the backside surface 82 of the film is facing the male mold 74 and can contact the major surface 86 of the male mold. The backside surface 82 can be a primer layer of the present invention. The male mold 74 is typically held at a suitable temperature (e.g. the mold temperature it typically in the range of room temperature to about 120° C. or in the range of about 60° C. to about 85° C.). Optional heating elements (not shown), e.g., IR heaters, can also be positioned in proximity to the taut film 72 to provide additional heating capability if desired.

The male mold 74 includes one or more male molding surfaces (also referred to in the art as "tables") of the desired shape(s) and contour(s). The number and relative positioning of the one or more male mold surfaces will depend upon factors including the nature of the shape being formed, whether the object to be formed includes one or more discrete constituents and whether more than one such shape or article is to be thermoformed from the film at the same time. For purposes of clarity, a single male molding surface is shown. The male molding surface(s) can be of varying heights, can have rounded or sharp edges, can be sloped or flat, or can have other contours as desired. As shown, male molding surface includes one or more sidewalls 84, a major top surface 86, and transition zones 88 in the form of edges between the sidewalls and the top surface. The male mold 74 is shown with the male mold surface facing upward for purposes of illustration. In actual practice, the male mold surface or other molds used in the thermoforming process can be oriented upward, toward a side, or downward as desired.

The top surface 86 can be considered the "major surface" of the mold. As used herein, the major surface of the mold corresponds to a visually discernable portion of the resulting three-dimensional object formed using the thermoforming method. That is, the major surface (e.g., area 75 in FIGS. 4 to 9) of the three-dimensional object or three-dimensional shaped film is formed from a portion of the film 72 that contacts the male mold (i.e, the portion of the film above the major surface 86 of the male mold 74) prior to the initial forming of the three-dimensional shaped film as shown in FIG. 3.

In contrast, the minor surfaces of the male mold corresponds to less visually discernable portion of the resulting three-dimensional shaped film or object formed using the thermoforming method. That is, the minor surface of the male mold includes the sidewalls 84 as well as the surface of the mold between the sidewalls 84 and the clamp 78. The minor surfaces of the resulting three-dimensional shaped film or three-dimensional object (e.g., area 76 in FIGS. 4-9) are formed from the portion of the film suspended over the minor surfaces of the male mold but not in contact with the male mold as shown in FIG. 3.

The male mold can include a transition region 88 that interconnect the major and minor surfaces of the mold. In the male mold shown in the figures, the transition region is an edge. The shape of the molds determines the dimensions and geometry of the transition region. As used herein, the transition region is typically considered part of the minor surface.

When a thermoformable film of the invention is used in this methodology, the primer layer can be an outer layer of the film and can contact the male molding surface. In the conventional thermoforming processes, the primer layer would not be in direct contact with any mold surface. Thus, in the conventional process, a male mold would not be used as in FIGS. 3 and 4 to form a three-dimensional shaped film. With a conventional primer layer, the primer layer tends to aggressively adhere to any mold surface that it contacts. It can be difficult to remove a film having a conventional primer layer from the mold without tearing the film. The conventional primer can adhere even when the mold surface has been provided with a release agent.

The primer layers of the present invention have a substantially reduced tendency to stick when present on the surface of a thermoformable film and in positioned contact with a mold surface. The primer layers typically are not tacky at room temperature. The primer layers of the invention can be more easily separated from the mold surface compared to conventional primers. Additionally, the primer layers of the invention can provide excellent coupling capabilities between materials to be adhered together, especially between metal-containing materials and/or polymers with polar and/or hydrogen bonding functionality (e.g., polyurethane polymers and the like).

Figure 4:
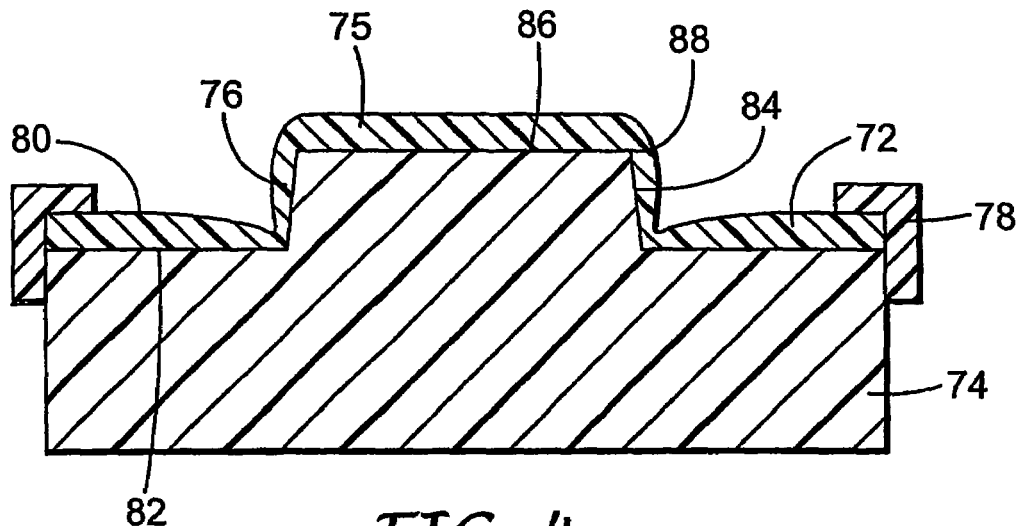
FIG. 4 is a schematic diagram of one embodiment of a thermoformed film positioned against molding surfaces of a male mold.

In FIG. 4, the film 72 is conformed against the male mold surface using conventional techniques, e.g., under pressure and/or vacuum with moderate heating. This can be accomplished by moving the clamping frame 78, the male mold 74, or both. In some embodiments, the film 72 can be brought into contact with the male mold 74 via vacuum. Accordingly, the male mold can be porous and/or can include channels (not shown) to facilitate such vacuum forming. In some embodiments, pressure is avoided to minimize the risk of damaging the outer surface of the film. This initial thermoforming step can be considered to be a pre-forming step. In some embodiments, the three-dimensional shaped film is further stretched upon being transferred to a female mold. In other embodiments, the three dimensional shaped film is not further stretched upon being transferred to a female mold but is transferred to a female mold to facilitate backfilling with reinforcement material.

The thickness is not uniform across the entire three-dimensional shaped film. The thickness along the major surface 75 (i.e., the portion of the film in contact with the major surface 86 of the male mold in FIG. 4) is greater than the average thickness along the minor surface 76 (i.e., the portion of the film adjacent to the sidewalls 84 and adjacent to the male mold surface between the sidewalls 84 and the clamp 78 in FIG. 4). In some embodiments, the three-dimensional shaped film in thinnest in the portion positioned above the transition region 88 of the male mold 90. The thickness of the film across the major surface 75 adjacent to the major surface 86 of the male mold is substantially uniform and substantially equal to the thickness of the polymeric film before thermoforming.

As used herein, the term "substantially uniform" when referring to thickness, optical density, or other physical characteristic of the major surface of the three-dimensional shape or object means that the thickness, optical density, or other physical characteristic varies less than about 10 percent across the major surface. In some embodiments, the thickness, optical density, or other physical characteristic varies less than about 5 percent or less than 3 percent across the major surface.

As used herein, the term "substantially equal" means the property being compared differ by less than about 10 percent. In some embodiments, the property being compared differ by less than about 5 percent or less than about 3 percent.

The thickness can correlate with the amount of stretching that can occur in that portion of the three-dimensional shape or object during the thermoforming process. Thus, the average strain along the minor surfaces of the three-dimensional shapes or objects tends to be higher than along the major surface. Further, the strain across the major surface can be substantially uniform.

Likewise, when the thermoformable film is a metallic polymeric film, the three-dimensional shape or object typically has an average optical density along the minor surfaces that is less than the optical density along the major surface. The optical density across the major surface can be substantially uniform.

The advantages of pre-forming the film 72 on a male mold can be apparent even during the pre-forming stage. In a conventional forming process (e.g., in which a film is formed against only a female mold surface without plug assistance), the portions of the film that are subjected to maximum stretch tend to be along the top surfaces of the three-dimensional shaped film or object. As a consequence, such surfaces may tend to stress-whiten, crack, craze, lose brightness, lose gloss, lose reflectivity, lose color density, or the like. In the finished article, these major surfaces tend to be the most visually significant in terms of affecting the overall visual appearance of the article. Loss of visual quality may be undesirable in those embodiments in which a decorative film is being used primarily to provide an article with a desired surface appearance.

In contrast, the method of the present invention protects the more visually significant surfaces to a greater degree. The portions of the film that are subjected to maximum stretch are generally those formed adjacent to the minor surfaces of the male mold. In this way, the visual qualities of the major surface 75 (adjacent to the major mold surface 86 of the male mold 74) of the three-dimensional shaped film can be substantially preserved. The practical result is that this thermoforming method tends to shift the visual defects due to stretching to areas of low visual significance. In the finished article, the major surfaces tend to be the most visually significant in terms of affecting the overall visual appearance of the article.

Although the minor surfaces (e.g., side surfaces and edges) typically experience a greater degree of stretching than the major surface (i.e., top surface), stretching on these surfaces can be acceptable because they are less visually significant compared to the more visually significant major surface (i.e., top surface) in the resultant three-dimensional object. As a consequence, the loss of reflectivity, brightness, color density, haze and the like occur across the minor surfaces rather than across the major surface.

After the film is pre-formed against the male mold 74, the three-dimensional shaped film 72 is transferred to a female mold 90. The female mold can be held at a suitable temperature that can soften the polymeric film (e.g., the mold temperature can be in the range of room temperature up to about 120° C. or in the range of about 60° C. to about 85° C.). The mold, for example, can be held at a temperature sufficient to soften the polymeric material.

Figure 5:
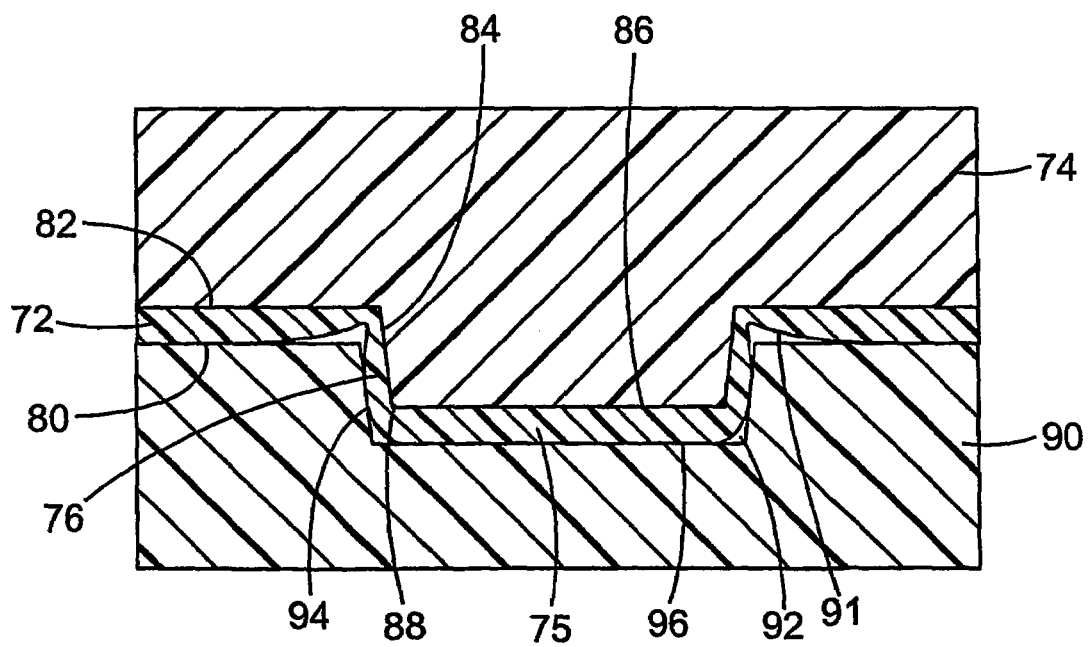
FIG. 5 is a schematic diagram of one embodiment of a male mold and a thermoformed film positioned in registry with a female mold.
Figure 6:
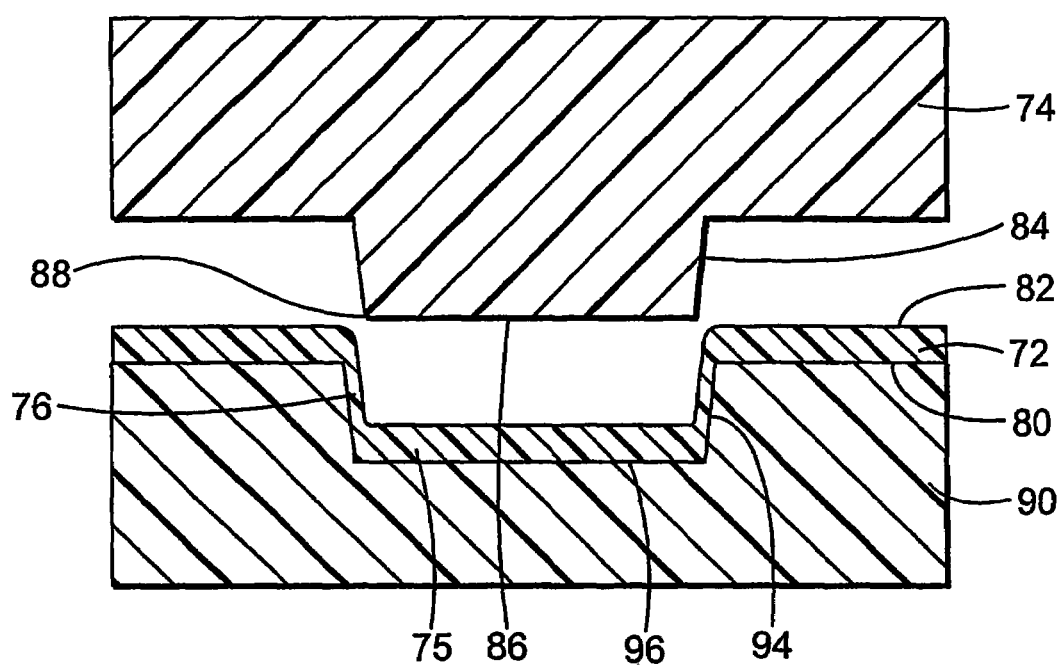
FIG. 6 is a schematic diagram of one embodiment, of a thermoformed film positioned against a female mold after transfer from a male mold.

The transfer typically occurs directly from the male mold 74 to the female mold 90 as shown in FIGS. 5 and 6. Using the male mold 74 to provide support for the film 72 during the transfer can avoid the need to use a separate, intermediate supporting member to accomplish the transfer. Any extra transfer steps between tooling components can increase the risk of damaging a delicate thermoformable film. Thus, supporting the pre-formed sheet upon the male mold 74 during this portion of the transfer helps preserve the thermoformed configuration of the pre-formed sheet and can facilitate the use of flexible, non-supporting films in the practice of the present invention. This direct transfer between the molds is particularly advantageous when the thermoformable film is a decorative, non-self-supporting film. Non-self-supporting films typically do not sufficiently retain the pre-formed shape when removed from the male mold without adequate support.

In FIG. 5, the male mold 74 bearing and supporting the three-dimensional shaped film 72 is engaged in registry with a corresponding female mold 90. The female mold has a major surface 96 that corresponds with the major surface 86 of the male mold 74 and sidewalls 94 that correspond with the sidewalls 84 of the male mold 74. Generally, the two molds are brought into registry in a manner analogous to the way in which two die halves of a cavity mold would be brought together. The female mold 90 generally includes one or more female mold cavities respectively corresponding to the one or more male mold surfaces on the male mold.

When the two molds are brought together, the male mold surfaces bearing the three-dimensional shaped film fit inside the female mold cavity. The female mold cavity is over-sized relative to the male mold surfaces by at least the thickness of the film 72. The different molds are typically sized to provide enough clearance so that the film is not unduly rubbed, abraded, torn, wrinkled, or otherwise disturbed when the two molds are brought together. That is, the female mold cavity is typically over-sized enough to allow the film 72 to be positioned between the molds without damaging the film 72. The fit of the male mold surfaces and film inside the female mold cavity is close, but not snug.

In some embodiments, the female mold is sufficiently oversized relative to the male mold such that the outer surface of the film 72 is spaced apart from the walls of the female mold cavity. This distance preferably is not too large or too small. If the distance is too large, the major film surfaces may stretch too much when transferred from the male mold to the female mold. This stretching could unduly detract from the visual appearance of these surfaces. The size of a gap between the molds depends on the size and shape of the objects formed. In some embodiments, the female mold can be sized to provide a gap of about 1 mm.

In some embodiments, the gap is less than about 0.5 mm, less than about 0.3 mm, or less than about 0.22 mm.

Once the female and male molds are positioned together, the pre-formed sheet 72 is transferred from the supporting male mold 74 directly to the female mold 90 as shown in FIG. 6. This can be accomplished using any suitable technique such as pressure applied through the male mold and/or a vacuum through the female mold 90. In some embodiments, the use of a vacuum through the female mold can minimize the risk of damaging the outer surface of the film. The female mold 90 can be porous and/or includes channels (not shown) to facilitate such vacuum transfer if a primer layer is an outer layer of the thermoformable film. The primer layers of the invention can release from the male molding surface, facilitating the transfer if a primer layer is the outer layer of the thermoformable film. After the transfer is complete, the male mold 74 can be withdrawn from the female mold, as shown in FIG. 6. The surface 82 that was facing the male mold surface is now exposed and the surface 80 that was exposed when attached to the male mold is now facing the female mold.

In some embodiments, when the film 72 is transferred to the female mold 90, the film 72 can be subjected to additional thermoforming so as to conform to the female molding surfaces. Thus, some additional, but minor stretching of the film can occur as a consequence of the additional thermoforming.

The degree of stretching along the major surface 75 areas of the three-dimensional shaped film is reduced compared to a process in which a similar shape is formed directly on the female mold without pre-forming on the male mold. For example, when a three-dimensional shape is formed on a female mold without plug assist, the average thickness variation of the film along a major surface can be about 22%. The thickness in the major surface is typically less than that of the film prior to thermoforming. In contrast, when using the method of the present invention, the average thickness variation along the major surface has been observed to be only about 2%. This ten-fold improvement indicates that the original thickness dimensions of the film along the major surface are preserved to a much greater extent in the practice of the present invention. Because thickness reduction directly correlates to losses of brightness, color density, reflectivity, and other important visually observable properties of a film, it can be appreciated that films formed in accordance with the present invention retain much higher levels of such qualities.

The articles prepared using the above thermoforming process can also differ from articles prepared using plug assist methods. Plug-assisted thermoforming methods use a plug or plunger to push a clamped, heated film into a mold. Plug-assist method tends to cause substantial, uniform stretching of the film and the overall thickness tends to be fairly uniform across the entire thermoformed shape. The thickness along the major surface is substantially equal to the thickness along the minor surface. However, the thickness is typically less than the thickness of the film used to prepare the three-dimensional object. In contrast, the method of the present invention produces shapes having a uniform thickness on a major surface but with thinner sections in areas that where the film is stretched to conform to the mold, as shown in FIGS. 3 to 8. Another distinguishing feature is that the thickness of the film in the major surface of the three-dimensional object is about the same as the thickness of the film prior to thermoforming.

If the thermoformed film of the present invention is sufficiently robust so as to be self-supporting, it can be cooled and removed from the female mold and then stored, further processed, combined with other parts, or otherwise used as desired. However, if the thermoformed film is of the non-self supporting type, as is the case with many embodiments of decorative films such as metallized polymeric films, the thermoformed film can be reinforced before removal from the female mold. The type of reinforcement and the methodology used to provide the reinforcement will depend upon the nature of the shape being formed.

Figure 7:
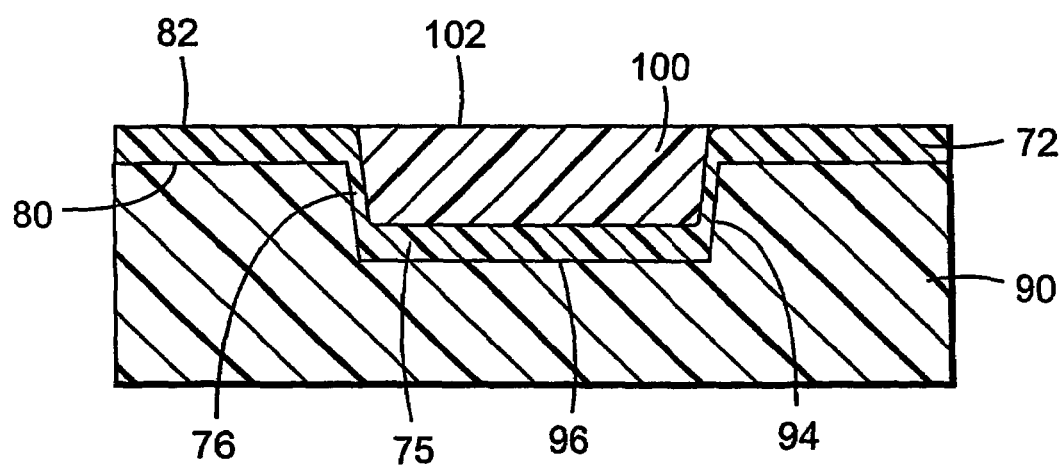
FIG. 7 is a schematic diagram of one embodiment of a thermoformed film positioned against a female mold and backfilled for reinforcement.

FIG. 7 shows one embodiment of a reinforced three-dimensional shaped film. Thermoformed film 72 can be backfilled with a curable fluid 100 while being supported in the female mold 90 to preserve the formed shape of the film. Backfilling can be accomplished using any suitable technique such as by injection molding, extruding, casting, or the like. U.S. Pat. No. 6,083,335, for example, describes a methodology in which injection molding is used to accomplish backfilling. However, because undue mold pressure can damage the visual appearance of the film, a suitably low pressure is typically used for backfilling in those embodiments in which visual appearance is important. In such embodiments, the use of injection molding or extruding are typically avoided as these methods involve heat and pressure that could affect the surface appearance of the film. Casting techniques can be used to reinforce the thermoformed shapes to minimize damage to the film. After filling the cavity, the fluid is allowed or caused to harden into a body that will help support the three-dimensional object when removed from the mold. The primer layer helps adhere the film to the resultant reinforcing body.

The nature of the backfilling fluid can vary depending upon the desired properties of the resultant object. If the object is to be conformable to nonplanar surfaces, the fluid desirably cures to form an elastomeric or plastically deformable material. For example, in the representative context in which the object is a nameplate for a vehicle, the same nameplate can be fabricated and then used on multiple types of cars whose panels have different curvatures. Distinct nameplates specially designed for individual vehicles are not required. If the object is to be attached to planar surfaces or serve a structural support function, fluids that cure to form stiffer, nonflexible bodies may be more desirable.

Typical fluids used for backfilling reinforcement generally include one or more polymers and/or polymer precursors. Representative examples of the polymers and/or resultant polymers, as the case may be, include one or more epoxies, polyurethanes, polyimides, polyamides, polysilicones, fluoropolymers, polyesters, polyethylenes, poly(meth)acrylates, copolymers of these, and the like. In some embodiments, polyurethane polymers, or materials that form such polymers, are preferred. The backfilling materials can be thermoplastic or thermosetting. Thermosetting materials that cure at temperatures below the thermoforming temperature are typically used for decorative films to avoid damaging the appearance of the film. Thermosetting polymers and/or precursors can include one or more kinds of curing/cross-linking functionality such as chemically cross-linkable functionality (e.g., the urethane linkage formed when hydroxy functionality cross-links in the presence of polyfunctional isocyanate cross-linking agents), energy-induced cross-linking functionality (e.g., pendant (meth)acrylate or epoxy groups that cure via cationic or free radical mechanisms), combinations of these, and the like.

A variety of fluids suitable for use in backfilling are known and/or commercially available. Representative materials suitable for use as backfill reinforcement have been described, for example, in EP 392,847 B1; U.S. Pat. No. 6,071,621; U.S. Pat. No. 5,968,657; U.S. Pat. No. 4,115,619; WO 88/07416; and the like.

Figure 8:
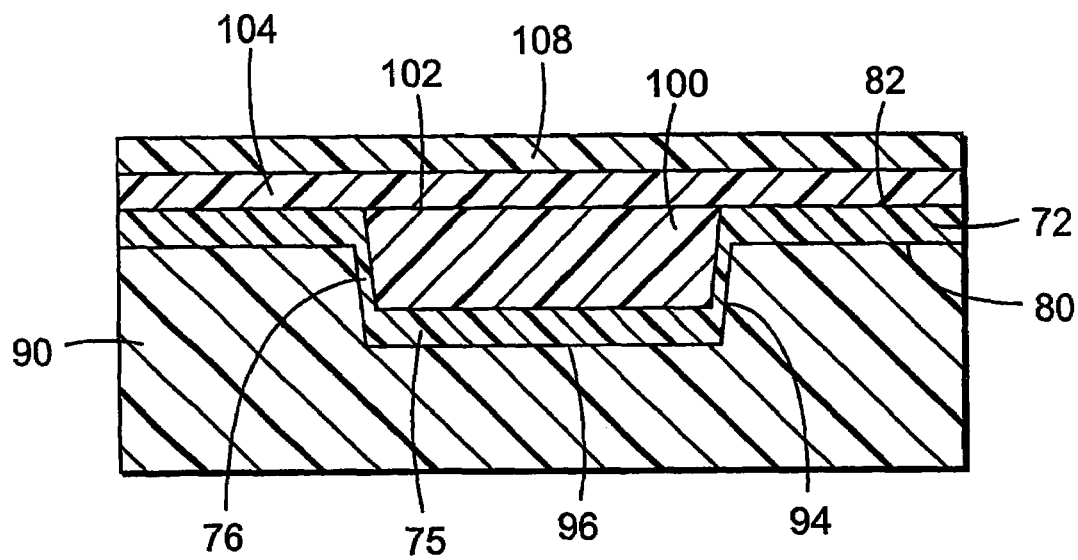
FIG. 8 is a schematic diagram of one embodiment of an adhesive coating and release liner provided over a backfilled, reinforced thermoformed film.

The mounting surface 102 of the resultant object optionally can be provided with an attachment system. In some embodiments, the attachment system includes a pressure sensitive adhesive that allows the resultant object to be adhered and/or fastened to a desired substrate. This can be accomplished in a variety of ways. Under one approach, as shown in FIG. 8, a fluid composition that includes a pressure sensitive adhesive, or precursor thereof, can be coated onto the mounting surface 102 and then dried or otherwise cured to provide a layer of the pressure sensitive adhesive 104. The exposed adhesive surface can be protected with a suitable release liner 108 until used. As an option, a primer and/or tie layer or treatment (not shown) can be interposed between the mounting surface 102 and the adhesive layer 104 to enhance adhesion to the mounting surface. If used, the primer layer can be a primer layer of the invention. Other conventional primer layers can also be used.

Figure 9:
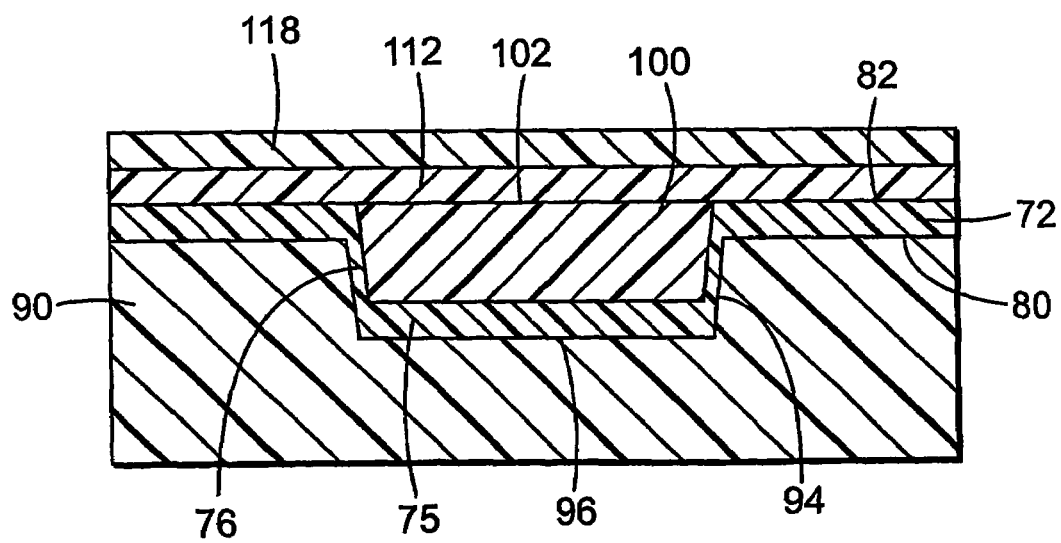
FIG. 9 is a schematic diagram of one embodiment of an adhesive foam tape and a release liner provided over a backfilled, reinforced thermoformed film.

An alternative approach for providing the mounting surface with an attachment system is shown in FIG. 9. A double sided, adhesive foam tape 112 can be applied onto the mounting surface 102. A release liner 118 protects the outer adhesive surface. The release liner can be removed when desired to expose the adhesive surface, allowing the object to be adhered to the desired substrate. One embodiment of a double-sided, adhesive tape useful in the practice of the present invention is a double-sided foam tape commercially available from Minnesota Mining and Manufacturing Company (3M), St. Paul, Minn.

The double-sided tape can be adhered to the molded object before or after the object is removed from the female mold. If applied before, then it is also an option to apply the tape either before or after the backfill fluid in the cavity hardens. It is often more convenient and/or desirable to apply the tape to the object while it is still in the female mold. This is more convenient, for instance, when many separate objects in a relatively large sheet are molded at one time and will be subsequently separated from the sheet and further processed via trimming, laser cutting, die cutting, or the like. Doing this before the fluid hardens also helps to planarize the backfill fluid in the one or more cavities of the female mold.

Still referring to FIG. 9, an optional primer or tie layer (not shown) can be used to enhance bonding of the tape to the body. The primer layer can be formed on all or a portion of the mounting surface 102 before the tape 112 is applied. This optional primer layer can be formulated from any suitable conventional primer composition or from a primer composition of the invention. The resultant structure can then be removed from the mold and then stored, cut, trimmed, further processed, combined with other parts, or otherwise used as desired in accordance with conventional practices.

In FIGS. 4 through 9, the male and female molds, or at least the shaping surfaces of these molds, typically include materials that exhibit release characteristics that allow the resultant formed film to be removed from the mold. In some cases, a suitable material, such as a fluoropolymer, silicone polymer, or the like can be integrally incorporated into the mold. Alternatively, one or more conventional mold release agents can be coated onto the mold from time to time as needed.

The present invention will now be described with reference to the following illustrative examples.

EXAMPLES

Examples 1-4

Films were prepared by mixing the various polyurethane dispersions shown in Table 1 with about 1 weight percent cross-linking agent (NEOCRYL CX-100) based on the total solids content of the urethane dispersion, and about 10 weight percent butyl carbitol solvent. The compositions were coated onto a release coated polyester film using conventional means such as a roll coater, to form a dried film thickness of about 1 mil. The coated films were dried for 2 minutes at 93° C., then for 3 minutes at 140° C.

A solvent based polyol composition was formed by mixing about 10 parts of DESMOPHEN 651A65, 25 parts of DESMOPHEN 670-80, 1 part of cellulose acetate butyrate, and 58 parts of a 50/50 solvent blend of DOWANOL PM acetate and methyl isobutyl ketone (parts were based on weight). The composition was stirred to mix well. To the composition was added 500 parts per million of dibutyl tin dilaurate catalyst and sufficient isocyanate (DESMODUR Z4470) to obtain an isocyanate to hydroxyl ratio between about 0.8 and 1.2. The composition was then coated onto each of the dried first films using conventional means to form a dried thickness of about 1 mil. The films were then dried and cured using a suitable temperature profile such as for about 1.5 minutes at 150° F. (66° C.), about 1.5 minutes at 200° F. (93° C.) and about 1.5 minutes at about 300° F. (149° C.).

The film with the coatings was then vapor coated with tin to an optical density between about 0.9 and 3. Then a 1 mil thick layer of ethylene acrylic acid (EAA is commercially available PRIMACOR 3330 from Dow Chemical Company, which has 6.5% acrylic acid and 93.5% ethylene), supported on (e.g., hot melt coated or extruded onto) a polyester release film, was electron beam irradiated at 5 Mrads and 175 kVolts and then laminated to the tin coating using a heated nip. This nip was heated to about 210° F. (99° C.). The release films were removed.

In thermoforming the film, a male mold was prepared having the letter "O" in relief. The letter had an overall size of 42 mm by 40 mm and a maximum depth of 7 mm. The width encompassed by the outside edge of the "O" and the inside edge of the "O" was about 8 mm, and the draft angle was about 8 degrees. The film was thermoformed on the male mold by taping the film with the EAA side against the mold. The film was heated using a hot air blower and the mold was heated to a temperature of about 160° F. (71° C.). A vacuum of about 26 inches (66 cm) of mercury was used to form the film after heating. After forming, the male mold bearing the formed film was placed into a corresponding female mold, heated to 160° F. (71° C.) and further formed using vacuum at about 26 inches (66 cm) of mercury.

After the second forming, the thickness of the film was measured. The original film had a thickness of about 4.4 mils (0.2 mm). At the top surface (i.e., major surface) between the inside edge and outside edge of the "O", the thickness was 4.2 mils (0.1 mm) using the thermoforming method of the invention. The top surface (i.e., major surface) exhibited no thinning of the metal layer. Another sample of the same film was formed only in the female mold. The thickness in the corresponding top portion was 2.8 mils, and noticeable thinning of the metal layer was observed.

After the female thermoforming, the molds were filled with a polyurethane reinforcing layer provided by pouring into the vacuum formed film a mixture containing equal equivalents of LEXOREZ 5901-300 polysalt polyol (available from Inolex Chemical Co.), about 500 parts per million dibutyl tin dilaurate catalyst, and DESMODUR N-100 polyisocyanate (available from Bayer Corp.). The mixture flowed into the cavities if the film was supported by the female mold. The heat from the mold was sufficient to cause the mixture to cure.

A film such as a polyamide film (MACROMELT 6240) could be applied to the uncured urethane to promote adhesion between an adhesive tape and the urethane. A pressure sensitive tape, such as a foam tape as described in EP 392847 A2, can be attached to the polyamide film. A release liner can be attached to the tape to protect it from dirt, or other contamination. The article can be then removed from the female mold, cooled, and further processed, for example die cut.

TABLE 1

Polyurethane layer combined with primer layer

| Example | Polyurethane dispersion |
|---|---|
| 1 | BAYHYDROL 110 |
| 2 | BAYHYDROL 121 |
| 3 | NEOREZ XR 9699 |
| 4 | NEOREZ XR 9603 |

Examples 5-7 and Comparative Example 1

A copolymer of ethylene acrylic acid (EAA), formed by reacting 93.5 weight percent ethylene and 6.5 weight percent acrylic acid, was compounded with ultraviolet stabilizers (1.35 weight percent 2-(2H-benzotriazol-2-yl)4,6-di-tert-pentylphenol and 0.9 weight percent 2-hydroxy-4-(octyloxy)benzophenone) and extruded as a film having a thickness of 1.35 mils onto a 92 gauge polyethylene terephthalate (PET) liner. Individual EAA film samples were exposed to 3, 5, and 7 megarads (Mrads) of electron beam radiation at an accelerating voltage of 175 kVolts. Comparative Example 1 had no exposure to electron beam radiation, Example 5 was exposed to 3 Mrads, Example 6 was exposed to 5 Mrads, and Example 7 was exposed to 7 Mrads. Each EAA film sample was then cut into a 1 inch wide film strip. The PET liner was then removed and the sample was inserted into the jaws of an Instron™ tensile testing apparatus with an oven enclosure. The sample was equilibrated to a temperature of 160° F. (71° C.) prior to measuring the mechanical properties. The jaw separation was 2 inches and the jaw separation rate was 12 inches/minute. The following data was recorded for the four samples:

TABLE 2

Mechanical Properties

| Sample | E-beam Radiation Dosage | Thickness (inches) | Force (lbs) | Tensile Strength (psi) | Elongation (%) |
|---|---|---|---|---|---|
| Comparative Example 1 | 0 Mrads | 0.00135 | 1.73 | 1287 | 360 |
| Example 5 | 3 Mrads | 0.00135 | 0.83 | 608 | >400 |
| Example 6 | 5 Mrads | 0.00135 | 0.90 | 675 | >400 |
| Example 7 | 7 Mrads | 0.00135 | 0.93 | 680 | >400 |

All the irradiated samples (Examples 5-7) had a lower tensile strength at maximum elongation compared to an otherwise identical sample that had not been cross-linked (Comparative Example 1). The tensile strength ratio (tensile strength of the cross-linked adhesive polymer at maximum percent elongation divided by the tensile strength of the non-cross-linked adhesive polymer at maximum elongation) was 0.47 for Example 5, 0.52 for Example 6, and 0.53 for Example 7.

Figure 10:
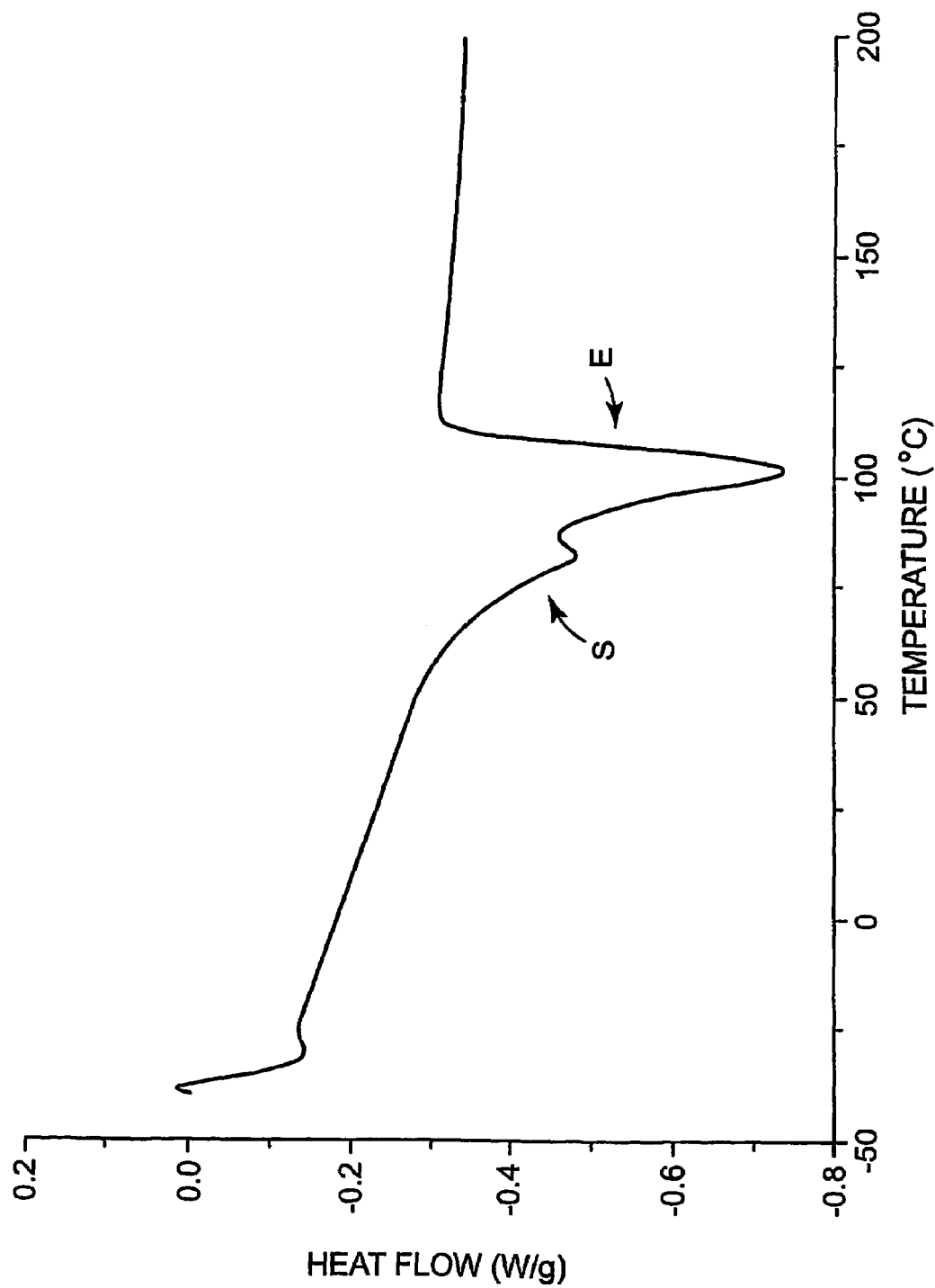
FIGS. 10 to 13 are differential scanning calorimeter (DSC) plots of an adhesive polymer exposed to 0, 3, 5 and 7 Mrad doses of electron beam radiation, respectively. The adhesive polymer was a copolymer of ethylene acrylic acid.
Figure 11:
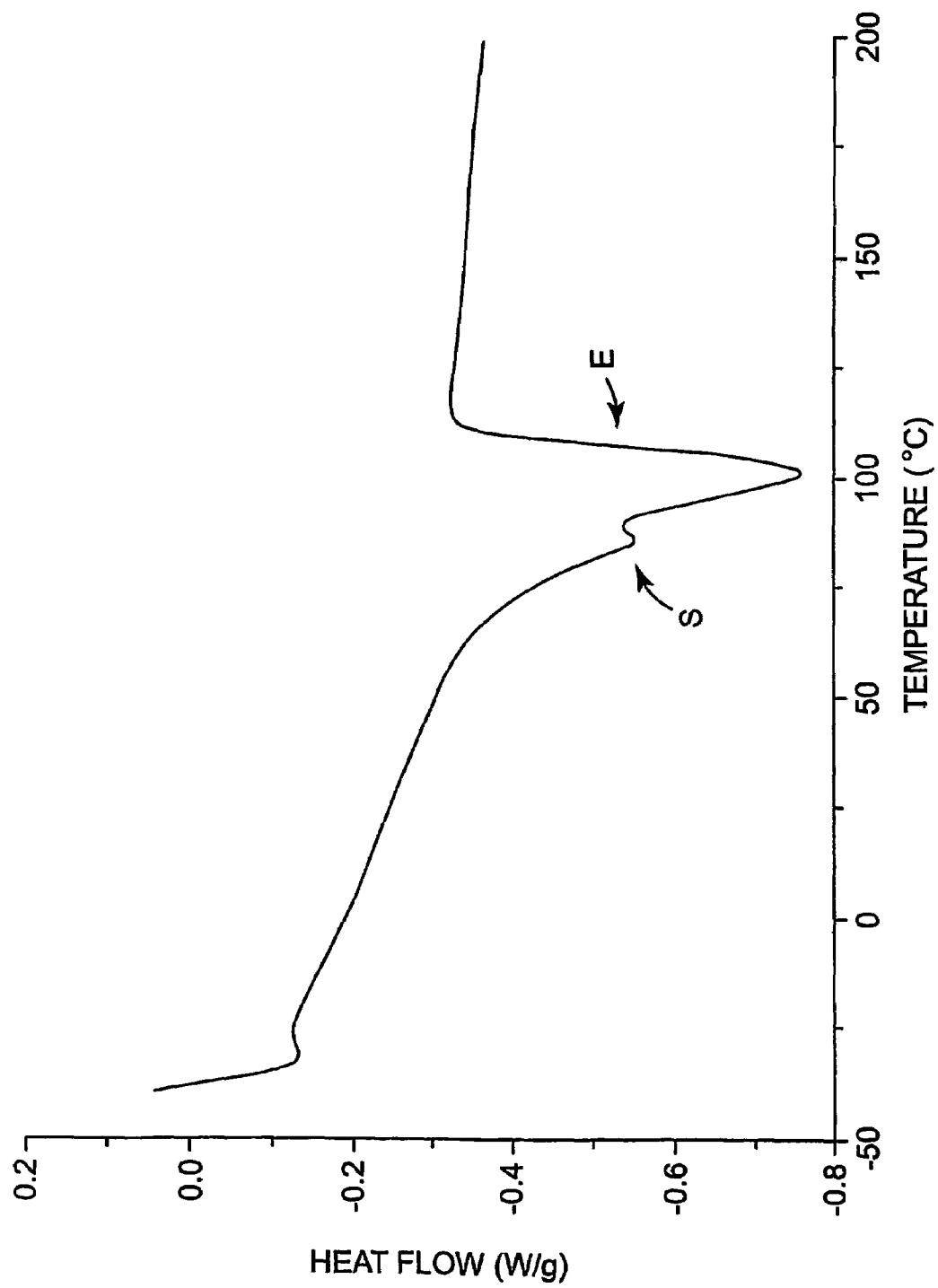
Figure 12:
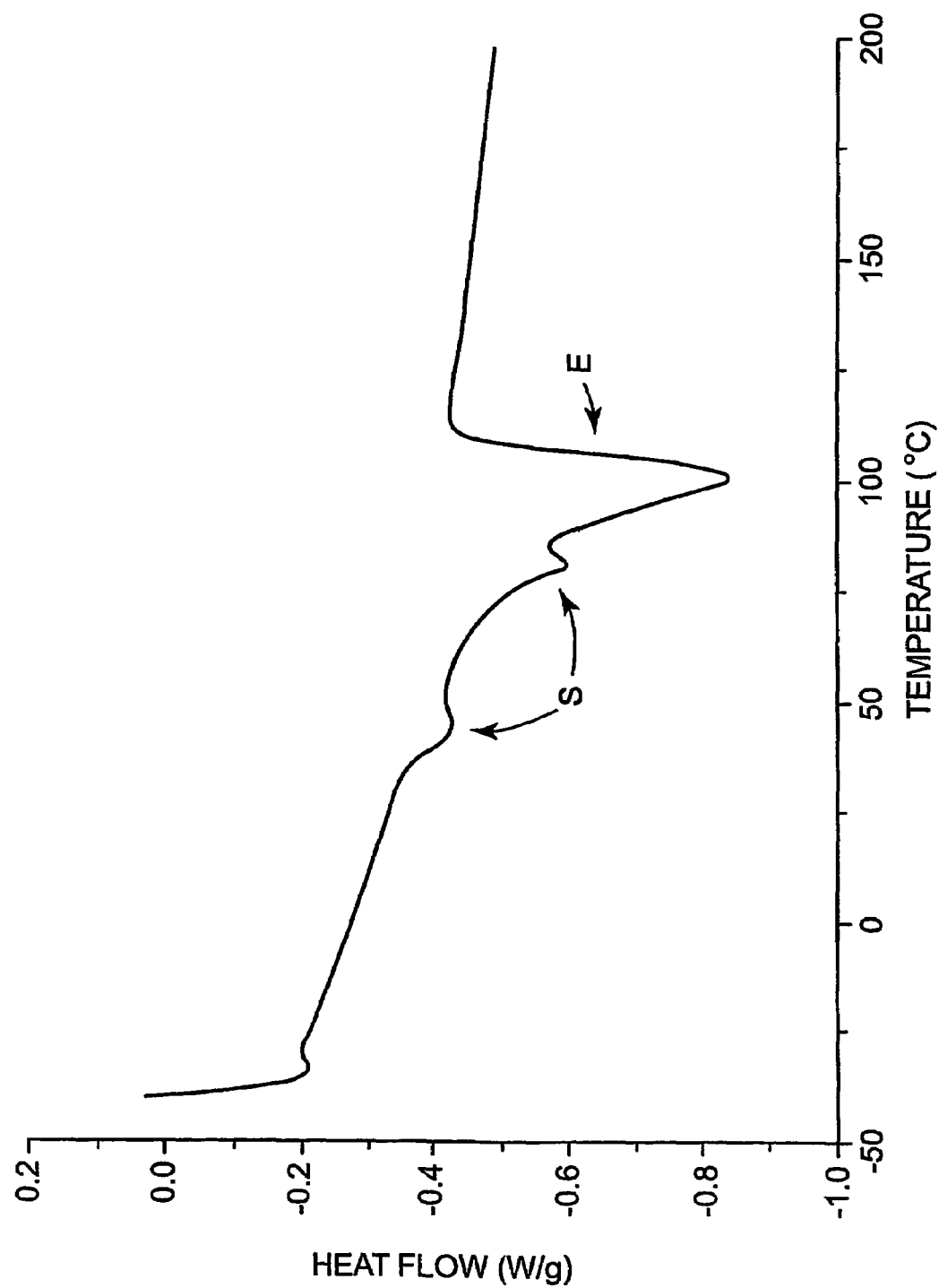
Figure 13:
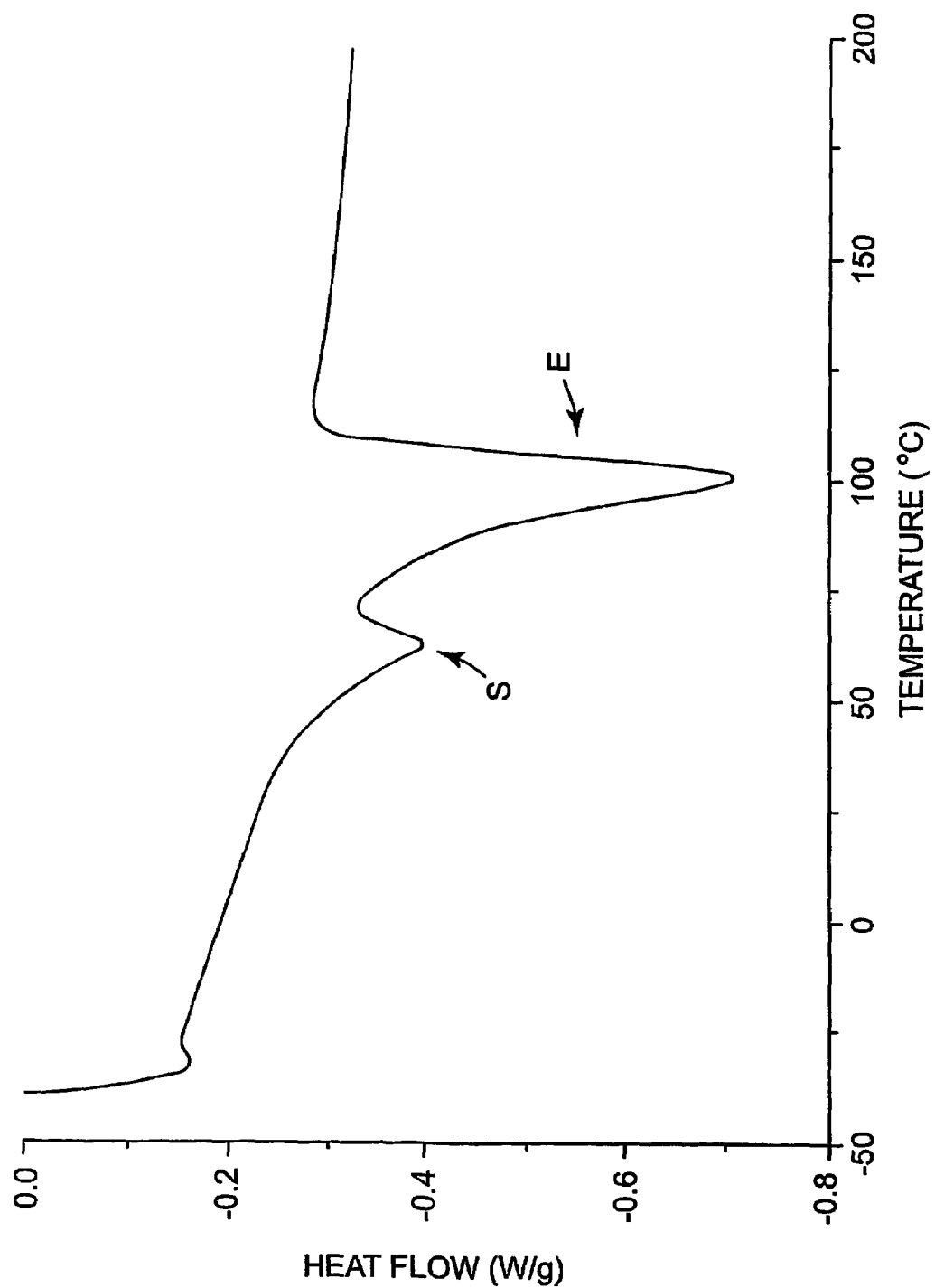

The samples included in Table 2 were also analyzed using a differential scanning calorimeter (DSC). The samples were heated from about −50° C. to about 200° C. The DSC plots are shown in FIG. 10 for Comparative Example 1, FIG. 11 for Example 5, FIG. 12 for Example 6, and FIG. 13 for Example 7. The DSC plots all had an endothermic peak at about 100° C. The shape of the DSC plots changed as the samples were subjected to higher dosages of electron beam radiation. For example, the location of the shoulder peak S shifted with increased irradiation. The shifts in the DSC plots confirm that the polymeric structure has been altered.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A thermoformable film comprising a primer layer and at least one additional layer, said primer layer comprising a cross-linked adhesive polymer having a semicrystalline region and a polar region, said cross-linked adhesive polymer (i) having a tensile strength at maximum elongation that is less than that of an otherwise identical adhesive polymer that has not been cross-linked, and (ii) being a reaction product of co-polymerizable compounds comprising a first monomer and a second monomer, wherein the first monomer is an olefinic monomer having ethylenic unsaturation and the second monomer comprises acrylic acid, a C1 to C20 acrylate ester, an acrylate salt, (meth)acrylic acid, a C1 to C20 (meth)acrylate ester, a (meth)acrylate salt, or a combination thereof; said at least one additional layer comprising an outermost protective layer, said outermost protective layer comprising polyurethane or a thermoplastic fluorinated polymer.

2. The thermoformable film of claim 1, wherein said additional layer further comprises a decorative layer and wherein said primer layer is positioned adjacent to said decorative layer.

3. The thermoformable film of claim 2, wherein said decorative layer comprises a metal-containing layer.

4. The thermoformable film of claim 1, wherein said at least one additional layer further comprises a decorative layer, wherein said decorative layer is interposed between a first primer layer and a second primer layer.

5. The thermoformable film of claim 1, wherein the weight ratio of the first monomer to the second monomer is in the range of about 80:20 to about 99:1.

6. The thermoformable film of claim 1, wherein the weight ratio of the first monomer to the second monomer is in the range of about 90:10 to about 96:4.

7. The thermoformable film of claim 1, wherein the cross-linked adhesive polymer comprises an ethylene acrylic acid copolymer, an ethylene (meth)acrylic acid copolymer, a combination thereof, a C1 to C20 ester thereof, or a salt thereof.

8. The thermoformable film of claim 1, wherein the cross-linked adhesive polymer is cross-linked using electron beam radiation and has a weight average molecular weight that is at least 90% of the weight average molecular weight of the otherwise identical adhesive polymer that has not been cross-linked.

9. The thermoformable film of claim 1, wherein the cross-linked adhesive polymer is cross-linked using electron beam radiation and has a weight average molecular weight that is greater than a weight average molecular weight of an otherwise identical adhesive polymer that has not been cross-linked.

10. The thermoformable film of claim 1, wherein said outermost protective layer comprises polyurethane.

11. The thermoformable film of claim 10, wherein said outermost protective layer comprises a water-based polyurethane, and said thermoformable film further comprises a solvent-based polyurethane inner layer positioned between said outermost protective layer and said primer layer.

12. A thermoformable film comprising a primer layer and at least one additional layer, said primer layer comprising a cross-linked adhesive polymer having a cross-linked semicrystalline region and a polar region, wherein the cross-linked adhesive polymer has a tensile strength at maximum elongation that is less than that of an otherwise identical adhesive polymer that has not been cross-linked, wherein said at least one additional layer comprises (i) a decorative layer and (ii) a protective layer that is transparent, wherein said primer layer is interposed between said decorative layer and said protective layer.

13. The thermoformable film of claim 12, wherein the decorative layer is a metal-containing layer.

14. The thermoformable film of claim 13, wherein the metal-containing layer has a thickness of about 50 to about 2500 Angstroms, and is formed via sputtering, vapor deposition, ion beam deposition, or chemical vapor deposition.

15. The thermoformable film of claim 12, wherein the protective layer comprises a at least one polyurethane protective layer or a thermoplastic fluorinated polymer protective layer.

16. The thermoformable film of claim 12, wherein the cross-linked adhesive polymer is a reaction product of co-polymerizable compounds comprising a first monomer and a second monomer, wherein the first monomer is an olefinic monomer having ethylenic unsaturation and the second monomer comprises acrylic acid, a C1 to C20 acrylate ester, an acrylate salt, (meth)acrylic acid, a C1 to C20 (meth)acrylate ester, a (meth)acrylate salt, or a combination thereof.

17. The thermoformable film of claim 12, wherein the cross-linked adhesive polymer comprises an ethylene acrylic acid copolymer, an ethylene (meth)acrylic acid copolymer, a combination thereof, a C1 to C20 ester thereof, or a salt thereof.

18. The thermoformable film of claim 12, wherein the cross-linked adhesive polymer is cross-linked using electron beam radiation and has a weight average molecular weight that is at least 90% of the weight average molecular weight of the otherwise identical adhesive polymer that has not been cross-linked.

19. A thermoformable film comprising a primer layer and at least one additional layer, said primer layer comprising a cross-linked adhesive polymer having a semicrystalline region and a polar region, said cross-linked adhesive polymer has having a tensile strength at maximum elongation that is less than that of an otherwise identical adhesive polymer that has not been cross-linked, wherein an exposed outer surface of said primer layer is not tacky at room temperature, said at least one additional layer comprising (i) a decorative metal-containing layer having a thickness of about 50 to about 2500 Angstroms, (ii) at least one polyurethane protective layer or a thermoplastic fluorinated polymer protective layer, or (iii) both (i) and (ii).

20. The thermoformable film of claim 19, wherein said polar region comprises a carboxylic acid, a carboxylate ester, a carboxylate salt, or a combination thereof.

21. The thermoformable film of claim 19, wherein the polar region comprises the reaction product of monomers comprising acrylic acid, an acrylate ester, an acrylate salt, (meth)acrylic acid, a (meth)acrylate ester, a (meth)acrylate salt, or a combination thereof.

22. The thermoformable film of claim 19, wherein the semicrystalline region comprises a polyolefin.

23. The thermoformable film of claim 19, wherein the cross-linked adhesive polymer comprises an ethylene acrylic acid copolymer, an ethylene (meth)acrylic acid copolymer, a combination thereof, a C1 to C20 ester thereof, or a salt thereof.

24. The thermoformable film of claim 19, wherein the cross-linked adhesive polymer is cross-linked using electron beam radiation and has a weight average molecular weight that is at least 90% of the weight average molecular weight of the otherwise identical adhesive polymer that has not been cross-linked.

25. The thermoformable film of claim 19, wherein the cross-linked adhesive polymer is cross-linked using electron beam radiation and has a weight average molecular weight that is greater than a weight average molecular weight of an otherwise identical adhesive polymer that has not been cross-linked.

26. The thermoformable film of claim 19, wherein the at least one additional layer comprises the decorative metal-containing layer, with the decorative metal-containing layer being interposed between the primer layer and a protective layer.

27. The thermoformable film of claim 26, wherein said decorative metal-containing layer is formed via sputtering, vapor deposition, ion beam deposition, or chemical vapor deposition.

28. A thermoformable film comprising (1) a primer layer said primer layer comprising a cross-linked adhesive polymer having a semicrystalline region and a polar region, said cross-linked adhesive polymer (i) comprising a reaction product of co-polymerizable compounds comprising a first monomer and a second monomer, wherein the first monomer is an olefinic monomer having ethylenic unsaturation and the second monomer comprises acrylic acid, an acrylate ester, an acrylate salt, (meth)acrylic acid, a (meth)acrylate ester, a (meth)acrylate salt, or a combination thereof, (ii) having a degree of crosslinking resulting from exposure to electron beam radiation at a dosage ranging from about 0.1 to about 10 Mrads and a radiation voltage ranging from about 25 to about 600 kVolts, (iii) having a weight average molecular weight that is at least 90% of the weight average molecular weight of an otherwise identical adhesive polymer that has not been cross-linked, and (iv) having a tensile strength at maximum elongation that is less than that of an otherwise identical adhesive polymer that has not been cross-linked; and 2(2) at least one additional layer comprising (i) a decorative metal-containing layer formed via sputtering, vapor deposition, ion beam deposition, or chemical vapor deposition, (ii) at least one polyurethane protective layer or a thermoplastic fluorinated polymer protective layer, or (iii) both (i) and (ii).

29. The thermoformable film of claim 28, wherein the weight ratio of the first monomer to the second monomer is in the range of about 80:20 to about 99:1.

30. The thermoformable film of claim 28, wherein the weight ratio of the first monomer to the second monomer is in the range of about 90:10 to about 96:4.

31. A method of making a thermoformable film comprising:
providing an adhesive polymer having a tensile strength at maximum elongation and having a semicrystalline region and a polar region;
cross-linking the adhesive polymer to form a cross-linked adhesive polymer and to reduce the tensile strength at maximum elongation;
preparing a primer layer comprising the cross-linked adhesive polymer; and
forming a thermoformable film comprising the primer layer and at least one additional layer, the at least one additional layer comprising (i) a decorative metal-containing layer having a thickness of about 50 to about 2500 Angstroms, (ii) at least one polyurethane protective layer or a thermoplastic fluorinated polymer protective layer, or (iii) both (i) and (ii).

32. The method of claim 31, wherein said cross-linking comprises forming a free radical intermediate.

33. The method of claim 31, wherein said cross-linking comprises irradiating the adhesive polymer with electron beam radiation.

34. The method of claim 31, wherein the additional layer comprises the decorative metal-containing layer, with the primer layer being adjacent to the decorative metal-containing layer.

35. The method of claim 34, further comprising:
sputtering, vapor deposition, ion beam deposition, or chemical vapor deposition the decorative metal-containing layer.

36. The method of claim 31, wherein the at least one additional layer comprises the decorative metal-containing layer and the at least one polyurethane protective layer, with the primer layer being interposed between the decorative metal-containing layer and the at least one polyurethane protective layer.

37. The method of claim 31, wherein the at least one additional layer comprises the decorative metal-containing layer and the at least one polyurethane protective layer, with the decorative metal-containing layer being interposed between the primer layer and the at least one polyurethane protective layer.

38. A method of forming a thermoformed article comprising:
providing a thermoformable film formed by the method of claim 31; and
thermoforming the film into a thermoformed article.

39. The method of claim 38, wherein the thermoformed article comprises a three-dimensional shaped film.

40. The method of claim 39, further comprising:
backfilling at least a portion of the three-dimensional shaped film so as to form a mounting surface on the thermoformed article.

41. The method of claim 38, further comprising:
providing an attachment system on a surface of the thermoformed article.

42. A method of forming a thermoformed article comprising:
providing a thermoformable film comprising a polymer layer comprising a cross-linked adhesive polymer having a cross-linked semicrystalline region and a polar region, wherein (i) the polymer layer forms an exposed outer surface of the thermoformable film, (ii) the cross-linked adhesive polymer has a tensile strength at maximum elongation that is less than that of an otherwise identical adhesive polymer that has not been cross-linked, and (iii) the cross-linked adhesive polymer is a reaction product of co-polymerizable compounds comprising a first monomer and a second monomer, wherein the first monomer is an olefinic monomer having ethylenic unsaturation and the second monomer comprises acrylic acid, a C1 to C20 acrylate ester, an acrylate salt, (meth)acrylic acid, a C1 to C20 (meth) acrylate ester, a (meth)acrylate salt, or a combination thereof; and
thermoforming the thermoformable film in a mold to form a thermoformed article.

43. The method of claim 42, wherein the thermoformed article comprises a three-dimensional shaped article.

44. The method of claim 43, further comprising:
backfilling at least a portion of the three-dimensional shaped article so as to form a mounting surface on the thermoformed article.

45. The method of claim 44, further comprising:
providing an attachment system on the mounting surface of the thermoformed article.

46. The method of claim 42, further comprising:
combining a protective layer with the polymer layer to form the thermoformable film.

47. The method of claim 46, further comprising:
sputtering, vapor deposition, ion beam deposition, or chemical vapor deposition a decorative metal-containing layer onto the protective layer.

* * * * *

UNITED STATES PATENT AND TRADEMARK OFFICE
CERTIFICATE OF CORRECTION

PATENT NO. : 7,361,402 B2
APPLICATION NO. : 10/491655
DATED : April 22, 2008
INVENTOR(S) : Michael A. Johnson It is certified that error appears in the above-identified patent and that said Letters Patent is hereby corrected as shown below:

Column 1
Line 46, delete "describe" and insert -- describes --, therefor.

Column 3
Line 2, delete "pas" and insert -- has --, therefor.
Line 35, after "one embodiment" delete ",".

Column 6
Line 4, delete "mm);" and insert -- mm). --, therefor.

Column 9
Line 5, delete "kvolts" and insert -- kVolts --, therefor.
Line 34, delete "monylphenol" and insert -- nonylphenol --, therefor.
Line 43, delete "hydroxy ethyl" and insert -- hydroxyethyl --, therefor.
Lines 51-52, delete "nonocrylate" and insert -- monoacrylate --, therefor.

Column 10
Line 14, delete "N-dimethylarnimonium" and insert -- N-dimethylammonium --, therefor.
Line 38, delete "acrlyate" and insert -- acrylate --, therefor.
Line 43, delete "sernicrystalline" and insert -- semicrystalline --, therefor.

Column 11
Lines 28-29, delete "fingicides" and insert -- fungicides --, therefor.

Column 12
Line 26, after "metal-containing" delete "layers" and insert -- layer --, therefor.
Line 33, after "example" delete ";" and insert -- , --, therefor.

Column 14
Line 19, delete "' DESMODUR''" and insert -- "DESMODUR" --, therefor.

Column 15
Line 46, after "constituents" insert -- , --.

UNITED STATES PATENT AND TRADEMARK OFFICE
CERTIFICATE OF CORRECTION

PATENT NO. : 7,361,402 B2
APPLICATION NO. : 10/491655
DATED : April 22, 2008
INVENTOR(S) : Michael A. Johnson It is certified that error appears in the above-identified patent and that said Letters Patent is hereby corrected as shown below:

<u>Column 22</u>
Line 41, delete ""0"" and insert -- "O" --, therefor.

<u>Column 25</u>
Line 35, in claim 15, after "comprises" delete "a".
Line 62, in claim 19, before "having" delete "has".

<u>Column 26</u>
Line 40, in claim 28, after "a primer layer" insert -- , --.
Line 59, in claim 28, delete "2(2)" and insert -- (2) --, therefor.

<u>Column 27</u>
Lines 32-33, in claim 35, after "deposition" insert -- of --, therefor.

<u>Column 28</u>
Lines 47-48, in claim 47, after "deposition" insert -- of --, therefor.

Signed and Sealed this

Twenty-ninth Day of September, 2009

David J. Kappos
*Director of the United States Patent and Trademark Office*